(12) United States Patent
Warren

(10) Patent No.: US 10,139,790 B2
(45) Date of Patent: Nov. 27, 2018

(54) POWERED FACEPLATE INTEGRATION

(71) Applicant: Vivint, Inc., Provo, UT (US)

(72) Inventor: Jeremy Bruce Warren, Draper, UT (US)

(73) Assignee: Vivint, Inc., Provo, UT (US)

( * ) Notice: Subject to any disclaimer, the term of this patent is extended or adjusted under 35 U.S.C. 154(b) by 328 days.

(21) Appl. No.: 14/735,961

(22) Filed: Jun. 10, 2015

(65) Prior Publication Data

US 2016/0363915 A1    Dec. 15, 2016

(51) Int. Cl.
| G05B 15/00 | (2006.01) |
| G05B 15/02 | (2006.01) |
| H04L 12/28 | (2006.01) |

(52) U.S. Cl.
CPC .......... *G05B 15/02* (2013.01); *H04L 12/2827* (2013.01)

(58) Field of Classification Search
CPC ............................ G05B 15/02; H04L 12/2827
USPC ........................................................... 700/83
See application file for complete search history.

(56) References Cited

U.S. PATENT DOCUMENTS

| 1,931,310 A | 10/1933 | Wegner |
| 2,015,698 A | 10/1935 | Emery |
| 2,023,819 A | 12/1935 | Pavelka |
| 2,134,695 A | 11/1938 | Bigman |
| 2,179,198 A | 11/1939 | Reed |
| 2,179,199 A | 11/1939 | Reed |
| 2,193,740 A | 3/1940 | Reed |
| 2,385,620 A | 9/1945 | Fleckenstein |
| 2,420,000 A | 5/1947 | Linton |
| 2,428,167 A | 9/1947 | Linton |
| 2,449,150 A | 9/1948 | Schnoll |
| 2,575,820 A | 11/1951 | Linton |
| 2,580,056 A | 12/1951 | Wheeler, Jr. |
| 2,596,166 A | 5/1952 | Peterson |
| 2,749,381 A | 6/1956 | Farish, Jr. |
| RE24,393 E | 11/1957 | McCarthy |

(Continued)

FOREIGN PATENT DOCUMENTS

| CA | 2419514 A1 | 8/2003 |
| CA | 2732657 A1 | 8/2012 |

(Continued)

OTHER PUBLICATIONS

English abstract and English machine translation of the specification and claims of CN103578810. Feb. 12, 2014.

(Continued)

*Primary Examiner* — Mohammad Ali
*Assistant Examiner* — Md Azad
(74) *Attorney, Agent, or Firm* — Holland & Hart LLP

(57) ABSTRACT

Methods and systems for operating a security and/or automation system using one or more powered faceplates are disclosed. The methods may include identifying an active communication connection with a first powered faceplate, receiving a first set of automation data, receiving a second set of automation data, analyzing the first set of automation data and the second set of automation data, and initiating an operation relating to at least one of a first powered faceplate, one or more other powered faceplates, an automation sensor, an automation system component, a user device, or a combination thereof based at least in part on the analyzing.

15 Claims, 14 Drawing Sheets

(56) References Cited

U.S. PATENT DOCUMENTS

| | | |
|---|---|---|
| 2,839,670 A | 6/1958 | Gladstone |
| 2,880,285 A | 3/1959 | Robison et al. |
| 3,522,595 A | 8/1970 | White |
| 3,739,226 A | 6/1973 | Seiter et al. |
| 4,000,405 A | 12/1976 | Horwinski et al. |
| 4,038,582 A | 7/1977 | Horwinski |
| 4,514,789 A | 4/1985 | Jester |
| 4,522,455 A | 6/1985 | Johnson |
| 4,611,264 A | 9/1986 | Bradley et al. |
| 4,617,613 A | 10/1986 | Rice et al. |
| 4,755,913 A | 7/1988 | Sleveland |
| 4,774,641 A | 9/1988 | Rice et al. |
| 4,947,281 A | 8/1990 | Boteler |
| 5,240,426 A | 8/1993 | Barla |
| 5,473,517 A | 12/1995 | Blackman |
| 5,481,442 A | 1/1996 | Dickie et al. |
| 5,485,356 A | 1/1996 | Nguyen |
| 5,495,402 A | 2/1996 | Houssian et al. |
| 5,544,025 A | 8/1996 | Bohlool et al. |
| 5,660,459 A | 8/1997 | Appelberg et al. |
| 5,670,776 A | 9/1997 | Rothbaum et al. |
| 5,713,655 A | 2/1998 | Blackman |
| 5,816,682 A | 10/1998 | Marischen et al. |
| 5,833,350 A | 11/1998 | Moreland |
| 5,874,693 A | 2/1999 | Rintz et al. |
| 6,000,807 A | 12/1999 | Moreland |
| 6,010,228 A | 1/2000 | Blackman et al. |
| 6,036,536 A | 3/2000 | Chiu |
| 6,051,787 A | 4/2000 | Rintz et al. |
| 6,087,588 A | 7/2000 | Soules et al. |
| 6,207,899 B1 | 3/2001 | Gillespie |
| 6,297,450 B1 | 10/2001 | Yu |
| 6,350,039 B1 | 2/2002 | Lee |
| 6,355,885 B1 | 3/2002 | Rintz et al. |
| 6,386,725 B1 | 5/2002 | Amburgey |
| 6,388,345 B1 | 5/2002 | Stimpson |
| 6,423,900 B1 | 7/2002 | Soules |
| 6,431,719 B1 | 8/2002 | Lau et al. |
| 6,518,724 B2 | 2/2003 | Janik |
| 6,547,411 B1 | 4/2003 | Dornbusch |
| 6,608,253 B1 | 8/2003 | Rintz |
| 6,642,452 B2 | 11/2003 | Masson |
| 6,648,496 B1 | 11/2003 | Elghoroury et al. |
| 6,765,149 B1 | 7/2004 | Ku |
| 6,857,760 B2 | 2/2005 | Chien |
| 6,864,798 B2 | 3/2005 | Janik |
| 6,883,927 B2 | 4/2005 | Cunningham et al. |
| 6,894,609 B2 | 5/2005 | Menard et al. |
| 6,943,296 B2 | 9/2005 | Perrella et al. |
| 6,993,289 B2 | 1/2006 | Janik |
| 7,011,422 B2 | 3/2006 | Robertson et al. |
| 7,036,948 B1 | 5/2006 | Wyatt |
| 7,247,793 B2 | 7/2007 | Hinkson et al. |
| 7,270,436 B2 | 9/2007 | Jasper |
| 7,318,653 B2 | 1/2008 | Chien |
| 7,463,148 B2 | 12/2008 | Leen |
| 7,506,990 B2 | 3/2009 | Glazner |
| 7,511,231 B2 | 3/2009 | Drane et al. |
| 7,511,628 B2 | 3/2009 | Salvestrini |
| 7,547,131 B2 | 6/2009 | Faunce |
| 7,549,785 B2 | 6/2009 | Faunce |
| 7,581,844 B1 | 9/2009 | Yang |
| 7,651,365 B2 | 1/2010 | Chien |
| 7,772,717 B2 | 8/2010 | Kitamura et al. |
| 7,850,322 B2 | 12/2010 | Glazner et al. |
| 7,918,667 B1 | 4/2011 | Shim |
| 7,997,925 B2 | 8/2011 | Lam et al. |
| 8,075,149 B2 | 12/2011 | Ko et al. |
| 8,175,533 B2 | 5/2012 | Schubert |
| 8,265,776 B2 | 9/2012 | Osann, Jr. |
| 8,304,652 B2 | 11/2012 | McBain |
| 8,393,747 B2 | 3/2013 | Kevelos et al. |
| 8,466,965 B2 | 6/2013 | Murphy et al. |
| 8,467,734 B2 | 6/2013 | Schubert |
| 8,491,159 B2 | 7/2013 | Recker et al. |
| 8,531,310 B2 | 9/2013 | Cutler |
| 8,558,710 B1 | 10/2013 | Nitz |
| 8,564,279 B2 | 10/2013 | Johnson et al. |
| 8,646,937 B2 | 2/2014 | Yang |
| 8,649,883 B2 | 2/2014 | Lu et al. |
| 8,663,347 B2 | 3/2014 | Lush |
| 8,674,221 B2 | 3/2014 | Yang |
| 8,752,972 B2 | 6/2014 | Bonarirgo |
| 8,797,723 B2 | 8/2014 | Hilton et al. |
| 8,832,469 B2 | 9/2014 | Sivertsen |
| 2003/0092297 A1 | 5/2003 | Reindle et al. |
| 2005/0012633 A1 | 1/2005 | Yoon |
| 2005/0259421 A1 | 11/2005 | Smith |
| 2006/0000971 A1 | 1/2006 | Jones |
| 2006/0262462 A1 | 11/2006 | Barton |
| 2007/0120978 A1 | 5/2007 | Jones |
| 2007/0193866 A1 | 8/2007 | Eder |
| 2007/0291469 A1 | 12/2007 | Chen |
| 2008/0024605 A1* | 1/2008 | Osann, Jr. ............ G05B 15/02 348/143 |
| 2008/0239701 A1 | 10/2008 | Wu |
| 2009/0025955 A1 | 1/2009 | McBain |
| 2009/0284384 A1 | 11/2009 | Barton |
| 2010/0033950 A1 | 2/2010 | Farrell |
| 2011/0031881 A1 | 2/2011 | Shim |
| 2011/0069480 A1 | 3/2011 | Yang |
| 2011/0260709 A1 | 10/2011 | Johnson et al. |
| 2012/0008307 A1 | 1/2012 | Delany |
| 2013/0032594 A1 | 2/2013 | Smith |
| 2013/0043978 A1 | 2/2013 | Brooks |
| 2013/0058073 A1 | 3/2013 | Walker et al. |
| 2013/0180139 A1 | 7/2013 | Underwood |
| 2013/0221868 A1 | 8/2013 | Diotte |
| 2013/0237088 A1 | 9/2013 | Sathyanarayana et al. |
| 2013/0261821 A1* | 10/2013 | Lu ..................... H04L 12/2807 700/289 |
| 2014/0054059 A1 | 2/2014 | Smith et al. |
| 2014/0054060 A1 | 2/2014 | Smith et al. |
| 2014/0054977 A1 | 2/2014 | Ting et al. |
| 2014/0166333 A1 | 6/2014 | Porcano |
| 2014/0266669 A1* | 9/2014 | Fadell ................ G05B 19/042 340/501 |
| 2014/0362559 A1 | 12/2014 | Chien |
| 2015/0256665 A1* | 9/2015 | Pera ................... H04L 12/2803 455/420 |
| 2016/0330042 A1* | 11/2016 | Andersen ............ H04L 12/282 |
| 2016/0364009 A1* | 12/2016 | Lemberger ........ H04N 21/4424 |

FOREIGN PATENT DOCUMENTS

| | | |
|---|---|---|
| CN | 2932773 Y | 8/2007 |
| CN | 202332620 U | 7/2012 |
| CN | 202585966 U | 12/2012 |
| CN | 202651527 U | 1/2013 |
| CN | 203312071 U | 11/2013 |
| CN | 103578810 A | 2/2014 |
| CN | 203503498 U | 3/2014 |
| CN | 203562615 U | 4/2014 |
| CN | 203799899 U | 8/2014 |
| CN | 203882819 U | 10/2014 |
| CN | 203932546 U | 11/2014 |
| DE | 102009031588 A1 | 1/2011 |
| DE | 202014100984 | 4/2014 |
| EP | 1646060 | 4/2006 |
| EP | 1727170 A1 | 11/2006 |
| EP | 1845588 A1 | 10/2007 |
| EP | 2008291 A1 | 12/2008 |
| EP | 2071600 A1 | 6/2009 |
| EP | 2149744 A1 | 2/2010 |
| EP | 2239825 A2 | 10/2010 |
| EP | 2348598 A2 | 7/2011 |
| EP | 2348602 A2 | 7/2011 |
| EP | 2360810 A2 | 8/2011 |
| EP | 2500993 A1 | 9/2012 |
| EP | 2568488 A1 | 3/2013 |
| EP | 2676405 A1 | 12/2013 |
| GB | 2489982 A | 10/2012 |
| GB | 2510565 A | 8/2014 |

(56) References Cited

FOREIGN PATENT DOCUMENTS

| | | |
|---|---|---|
| JP | 2005353491 A | 12/2005 |
| JP | 2007280853 A | 10/2007 |
| WO | 2002058196 | 7/2002 |
| WO | 2008092313 A1 | 8/2008 |
| WO | 2008114041 A1 | 9/2008 |
| WO | 2010072393 A1 | 7/2010 |
| WO | 2012109696 A1 | 8/2012 |
| WO | 2014047634 A1 | 3/2014 |

OTHER PUBLICATIONS

English abstract and English machine translation of the specification and claims of CN202332620. Jul. 11, 2012.
English abstract and English machine translation of the specification and claims of CN202585966. Dec. 5, 2012.
English abstract and English machine translation of the specification and claims of CN202651527. Jan. 2, 2013.
English abstract and English machine translation of the specification and claims of CN203312071. Nov. 27, 2013.
English abstract and English machine translation of the specification and claims of CN203503498. Mar. 26, 2014.
English abstract and English machine translation of the specification and claims of CN203562615. Apr. 23, 2014.
English abstract and English machine translation of the specification and claims of CN203799899. Aug. 27, 2014.
English abstract and English machine translation of the specification and claims of CN203882819. Oct. 15, 2014.
English abstract and English machine translation of the specification and claims of CN203932546. Nov. 5, 2014.
English abstract and English machine translation of the specification and claims of CN2932773. Aug. 8, 2007.
English abstract and English machine translation of the specification and claims of DE102009031588. Jan. 13, 2011.
English machine translation of the specification, claims and abstract of DE202014100984. Apr. 22, 2014.
English abstract and English machine translation of the specification and claims of EP1727170. Nov. 29, 2006.
English abstract and English machine translation of the specification and claims of EP1845588. Oct. 17, 2007.
English abstract and English machine translation of the specification and claims of EP2008291. Dec. 31, 2008.
English abstract and English machine translation of the specification and claims of EP2071600. Jun. 17, 2009.
English abstract and English machine translation of the specification and claims of EP2239825. Oct. 13, 2010.
English abstract and English machine translation of the specification and claims of EP2348598. Jul. 27, 2011.
English abstract and English machine translation of the specification and claims of EP2348602. Jul. 27, 2011.
English abstract and English machine translation of the specification and claims of EP2360810. Nov. 24, 2008.
English abstract and English machine translation of the specification and claims of EP2500993. Sep. 19, 2012.
English abstract and English machine translation of the specification and claims of EP2568488. Mar. 13, 2013.
English abstract and English machine translation of the specification and claims of JP2005353491. Dec. 22, 2005.
English abstract and English machine translation of the specification and claims of JP2007280853. Oct. 25, 2007.
English abstract of WO2008092313. Aug. 7, 2008.
English abstract and English machine translation of the specification and claims of WO2010072393. Jul. 1, 2010.

\* cited by examiner

POWERED FACEPLATE INTEGRATION

BACKGROUND

The present disclosure, for example, relates to security and/or automation systems, and more particularly to powered faceplate integration with other automation and/or security devices.

Security and automation systems are widely deployed to provide various types of communication and functional features such as monitoring, communication, notification, and/or others. These systems may be capable of supporting communication with a user through a communication connection or a system management action.

Current security and/or automation systems lack functionality and features relating to faceplates that are scattered throughout a structure. Current faceplates fail to provide low cost, high efficiency functions and features relating to one or more premises. Moreover, current faceplates are cumbersome, require time intensive replacements, and are limited in their function, alone or in combination, with other structural elements. Thus, there exists a need in the art for new systems and methods.

SUMMARY

In some embodiments, one or more powered faceplate devices are installed and relate to a structure. These powered faceplate devices may include one or more sensors and/or elements that enable one or more functions and/or features relating to conditions relating to a premises. In some embodiments, the one or more powered faceplates may be free of wiring and connect to a power source based on one or more projections and/or other methods.

The powered faceplate device may communicate wirelessly with each other and enabling progressive tracking and/or in some cases with other elements of a security and/or an automation system. In some embodiments, the powered faceplate device may receive information that initiates one or more operations, from another faceplate, another apparatus, and/or a remote server. The powered faceplate device may capture one or more sets of automation data and/or may capture one or more types of automation data at different times, among other operations.

Methods, systems, and apparatuses are disclosed. Methods for operating a security and/or an automation system using one or more powered faceplates are disclosed. In some embodiments, methods may include identifying an active communication connection with a first powered faceplate, receiving a first set of automation data from at least one of the first powered faceplate, one or more other powered faceplates, and/or a combination thereof, receiving a second set of automation data from at least one of an automation sensor, an automation system component, a user device, and/or a combination thereof, analyzing the first set of automation data and/or the second set of automation data, initiating an operation relating to at least one of the first powered faceplate, the one or more other powered faceplates, the automation sensor, the automation system component, the user device, and/or a combination thereof based at least in part on the analyzing.

In some embodiments, the first set of automation data and/or the second set of automation data may include at least one of image data, proximity data, audio data, motion data, environment data, and/or a combination thereof. In some embodiments, the first powered faceplate may not be wired to a power source. In some embodiments, the first set of automation data includes first automation data captured by the first powered faceplate and/or second automation data captured by the one or more other powered faceplates. In some embodiments, the first powered faceplate may capture the first automation data during a different time than the one or more other powered faceplates may capture the second automation data.

In some embodiments, the operation may include an instruction. In some embodiments, the first set of automation data may include first automation data captured by at least one of the first powered faceplate and/or the one or more other powered faceplates and/or second automation data captured by the one or more other powered faceplates. In some embodiments, the one or more other powered faceplates may capture the second automation data based at least in part on the instruction.

In some embodiments, the first set of automation data may include first automation data captured by at least one of the first powered faceplate and/or the one or more other powered faceplates and/or second automation data captured by the at least one of the first powered faceplate and/or the one or more other powered faceplates. In some embodiments, at least one of the first powered faceplate and/or the one or more other powered faceplates may capture the second automation data based at least in part on the operation.

In some embodiments, the first set of automation data may include first automation data captured by the first powered faceplate and/or second automation data captured by the one or more other powered faceplates. In some embodiments, the first powered faceplate may capture the first automation data at least partially during a period that the one or more other powered faceplates may capture the second automation data.

In some embodiments, analyzing the first set of automation data may include comparing the first automation data with the second automation data, and/or identifying at least one characteristic of the first automation data and the second automation data. In some embodiments, analyzing the first set of automation data may include comparing at least a portion of the first set of automation data with historic automation data.

In some embodiments, the first powered faceplate and at least some of the one or more other powered faceplates capture the first set of automation data at different heights while positioned on a same level of a premises. In some embodiments, the first set of automation data and/or the second set of automation data may include occupancy data relating to a premises associated with the first powered faceplate and/or first automation data captured by the first powered faceplate. In some embodiments, initiating the operation may be based at least in part on a sequence of receiving the automation data captured by the first powered faceplate, the one or more other powered faceplates, and/or the automation sensor.

In some embodiments, initiating the operation may include communicating via the active communication connection. In some embodiments, the active communication connection permits communication between the first powered faceplate and at least some of the one or more other powered faceplates and/or some other device. In some embodiments, the methods may include establishing the active communication connection with the first powered faceplate by connecting the first powered faceplate to a power source.

In some embodiments, the methods may include establishing the active communication connection by a projection of the first powered faceplate interacting with a power source. In some embodiments, the interaction of the first powered faceplate with the power source is free of wiring.

In some embodiments, the automation data may include first automation data captured by the first powered faceplate and/or second automation data captured by the automation sensor. In some embodiments, analyzing the automation data may include comparing the first automation data with the second automation data, and/or identifying at least one characteristic of the first automation data and/or the second automation data.

Faceplates for security and/or automation systems are disclosed. In some embodiments, the faceplates may include an outer surface, an inner surface, an electrical component receiving hole, two locking projections extending from the inner surface to conduct electricity from a power source and lock the faceplate in position, and/or electrical circuitry to power at least one automation component on the faceplate.

In some embodiments, each of the two locking projections may include a locking component positioned on a distal end to mate with a powered element of an electrical component. In some embodiments, the locking component releasably mates with the powered element. In some embodiments, the locking component rotates relative to at least one locking projection to mate with the powered element.

In some embodiments, at least a portion of the inner surface flexes to contact a wall in at least three separate points spaced along a perimeter of the inner surface. In some embodiments, at least one automation component may include a wireless transceiver, and/or at least one of an image sensor, an audio sensor, a motion sensor, and/or an environment sensor. In some embodiments, the faceplate is free of a hole to receive a screw.

Security and/or automation systems are disclosed. In some embodiments, the systems may include a powered faceplate having a transceiver and at least one automation component, a processor in electronic communication with one or more electrical components, memory in electronic communication with the processor, and a processing device in electronic communication with at least one of the one or more electrical components, the memory, and/or the processor. In some embodiments, the processing device may receive automation data via the at least one automation component.

In some embodiments, the processing device may initiate an operation based at least in part on the automation data. In some embodiments, an operation may include instructing the powered faceplate to capture additional automation data. In some embodiments, the automation data and the additional automation data are of different types. In some embodiments, the operation may include sending a notification to a user. In some embodiments, the systems may include a remote server in electronic communication with at least one of the powered faceplate and the processing device. In some embodiments, at least one of the processing device or the remote server analyzes the automation data.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

There exists a need in the art for a powered faceplate device that can provide features that consumers desire, include low-cost, discrete monitoring and related actions. One current problem, among others, with current faceplates is the requirement for complicated and cumbersome wiring procedures. Another problem includes limited functionality of currently-offered faceplates.

The present systems and methods solve these problems by providing a powered faceplate device that can interact with a power source free of wiring and that can provide numerous functions when integrated with a remote server and/or a security and/or an automation system, among other things. For example, a powered faceplate device including one or more sensors and/or elements allows for progressive monitoring within an area such as a room and/or throughout a home. Additionally, the systems and methods facilitate communication from one powered faceplate device to other powered faceplate devices and/or a central apparatus within a home and/or a user device. This communication enables initiation of many operations by the powered faceplate device(s) and/or others. In some embodiments, the powered faceplate device can receive, capture, and/or record one or more types of automation data that can then be used by the powered faceplate device, another device, and/or some combination.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
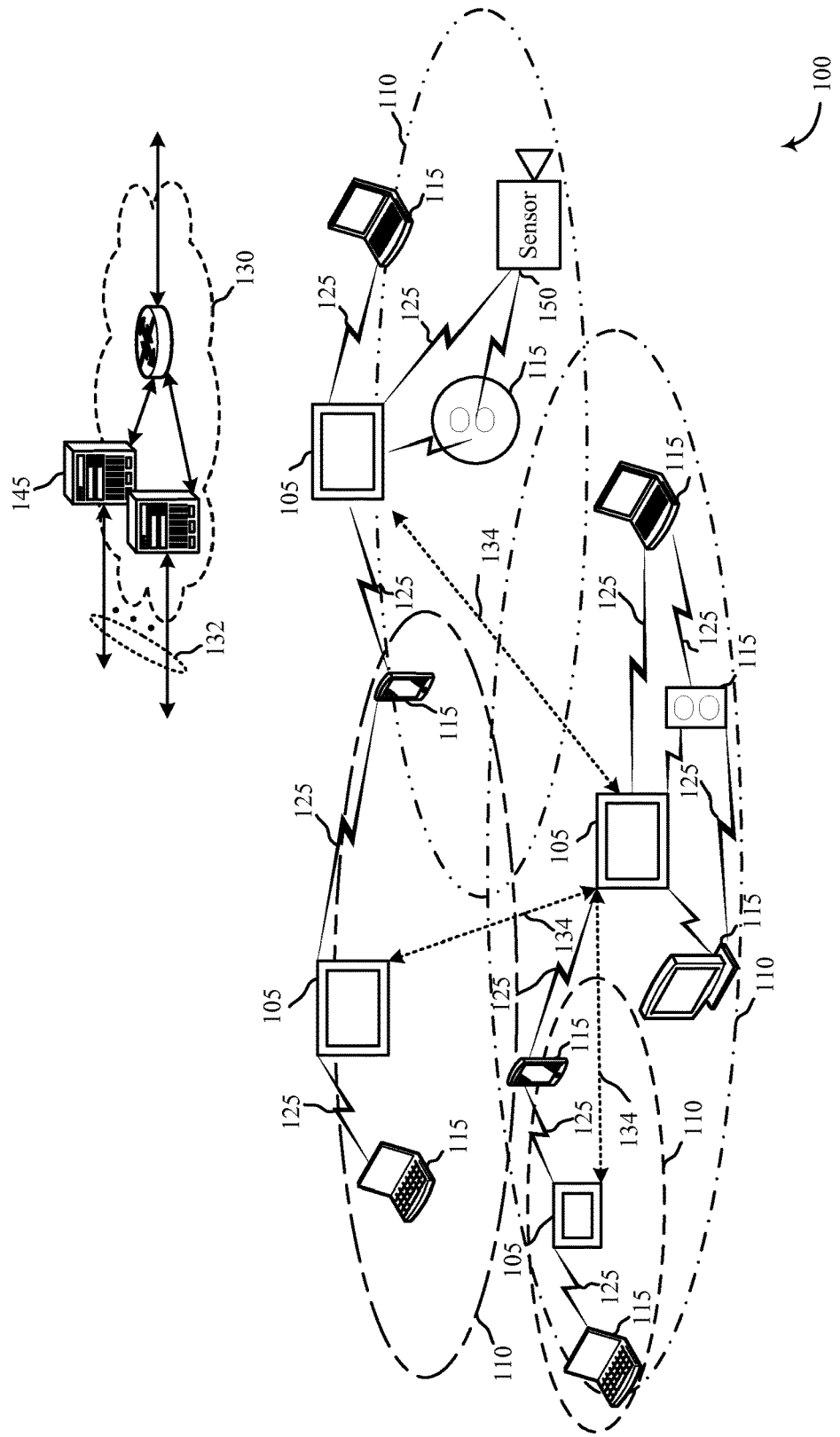
FIG. 1 shows a block diagram relating to a security and/or an automation system, in accordance with various aspects of this disclosure.

FIG. 1 illustrates an example of a communications system 100 in accordance with various aspects of the disclosure. The communications system 100 may include apparatuses 105, devices 115, a network 130, and/or sensors 150. The network 130 may provide user authentication, encryption, access authorization, tracking, Internet Protocol (IP) connectivity, and other access, calculation, modification, and/or functions. The apparatuses 105 may interface with the network 130 through a first set of wired and/or wireless communication links 132 to communicate with one or more remote servers 145. The devices 115 may interface with the network 130 through a first set of wired and/or wireless communication links 132 to communicate with one or more remote servers 145. The apparatuses 105 may perform communication configuration, adjustment, and/or scheduling for communication with the devices 115, or may operate under the control of a controller. In various examples, the apparatuses 105 may communicate—either directly or indirectly (e.g., through network 130)—with each other over a second set of wired and/or wireless communication links 134. In various examples, the devices 115 may communicate—either directly or indirectly (e.g., through network 130)—with each other over a second set of wired and/or wireless communication links 134. Apparatuses 105 may communicate with a back end server (such as the remote servers 145)—directly and/or indirectly—using the first set of one or more communication links 132.

The apparatuses 105 may wirelessly communicate with the devices 115 via one or more antennas. Each of the apparatuses 105 may provide communication coverage for a respective geographic coverage area 110. In some examples, apparatuses 105 may be referred to as a control device, a control panel, a base transceiver station, a radio base station, an access point, a radio transceiver, or some other suitable terminology. The geographic coverage area 110 for an apparatus 105 may be divided into sectors making up only a portion of the coverage area. The communications system 100 may include apparatuses 105 of different types. There may be overlapping geographic coverage areas 110 for one or more different parameters, including different technologies, features, subscriber preferences, hardware, software, technology, and/or methods. For example, each apparatus 105 may be related to one or more discrete structures (e.g., a home, a business) and each of the one more discrete structures may be related to one or more discrete areas. In other examples, multiple apparatuses 105 may be related to the same one or more discrete structures (e.g., multiple control panels relating to a home and/or a business complex).

The devices 115 may be dispersed throughout the communications system 100 and each device 115 may be stationary and/or mobile. A device 115 may include a powered faceplate device, a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a camera, and/or the like. A device 115 may also include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

The apparatuses 105 may wirelessly communicate with the sensors 150 via one or more antennas. The sensors 150 may be dispersed throughout the communications system 100 and each sensor 150 may be stationary and/or mobile. A sensor 150 may include and/or be one or more sensors that sense: proximity, motion, temperatures, humidity, sound level, smoke, structural features (e.g., glass breaking, window position, door position), time, light, geo-location data of a user and/or a device, distance, biometrics, weight, speed, height, size, preferences, light, darkness, weather, time, system performance, and/or other inputs that relate to a security and/or an automation system.

The devices 115 may wirelessly communicate with the sensors 150 via one or more antennas. A device 115 and/or a sensor 150 may be able to communicate through one or more wired and/or wireless connections with various components such as apparatuses, control panels, base stations, and/or network equipment (e.g., servers, wireless communication points, etc.) and/or the like.

The communication links 125 shown in communications system 100 may include uplink (UL) transmissions from a device 115 to an apparatus 105 and/or one or more other devices 115, and/or downlink (DL) transmissions, from an apparatus 105 to a device 115 and/or from a device 115 to one or more other devices 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 125 may transmit bidirectional communications and/or unidirectional communications. Communication links 125 may include one or more connections, including but not limited to, 345 MHz, Wi-Fi, BLUETOOTH®, BLUETOOTH® Low Energy, cellular, Z-WAVE®, 802.11, peer-to-peer, LAN, WLAN, Ethernet, fire wire, fiber optic, and/or other connection types related to security and/or automation systems.

In some embodiments, communications system 100, apparatuses 105 and/or devices 115 may include one or more antennas for employing antenna diversity schemes to improve communication quality and reliability between apparatuses 105 and devices 115. Additionally or alternatively, apparatuses 105 and/or devices 115 may employ multiple-input, multiple-output (MIMO) techniques that may take advantage of multi-path, mesh-type environments to transmit multiple spatial layers carrying the same or different coded data.

While the devices 115 may communicate with each other through the apparatus 105 using communication links 125, each device 115 may also communicate directly with one or more other devices, such as devices 115, via one or more direct communication links 134. Two or more devices 115 may communicate via a direct communication link 134 when both devices 115 are in the geographic coverage area 110 or when one or neither of devices 115 is within the geographic coverage area 110. Examples of direct communication links 134 may include Wi-Fi Direct, BLUETOOTH®, wired, and/or, and other P2P group connections. The devices 115 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within communications system 100.

Figure 2:
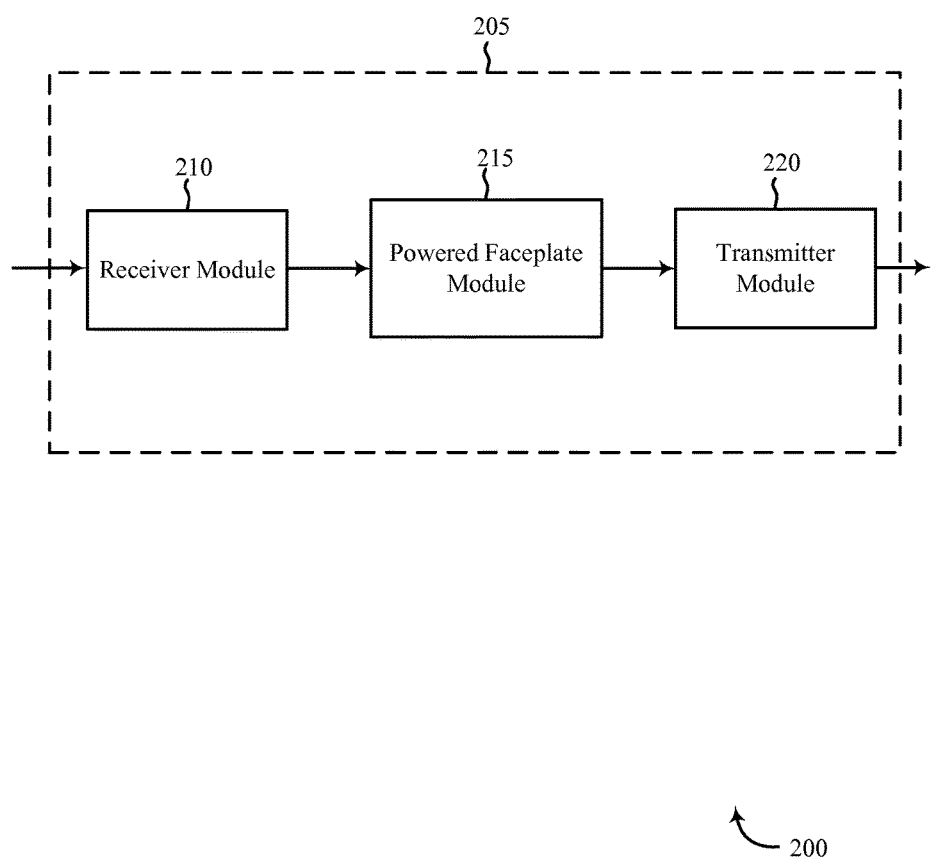
FIG. 2 shows a block diagram of a device relating to a security and/or an automation system, in accordance with various aspects of this disclosure.

FIG. 2 shows a system 200 of an apparatus 205 for use in electronic communication, in accordance with various aspects of this disclosure. The apparatus 205 may be an example of one or more aspects of an apparatus 105 described with reference to FIG. 1 and others. The apparatus 205 may include a receiver module 210, a powered faceplate module 215, and/or a transmitter module 220. The apparatus 205 may also be or include a processor. Each of these modules may be in communication with each other—directly and/or indirectly.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive automation data. The receiver module 210 may be configured to receive information associated with, related to, and/or transmitted by a powered faceplate device 115. Information may be passed on to the powered faceplate module 215, and to other components of the apparatus 205.

The powered faceplate module 215 may perform one or more operations relating to a powered faceplate and/or one or more other security and/or automation system devices. The operations, features, and methods relating to powered faceplate module 215 may be performed regardless of whether the system includes a powered faceplate device 115 and/or a similar device 115. References to a powered faceplate device 115 include all functions, features, and capabilities disclosed with respect to any device 115, unless otherwise specifically noted.

The transmitter module 220 may transmit the one or more signals received from other components of the apparatus 205. The transmitter module 220 may transmit automation data, data that has an action performed on it, summaries, analysis, determinations, initiations, operations, instructions, alerts, statuses, errors, and/or other information relating to one or more automation components, among other things. In some examples, the transmitter module 220 may be collocated with the receiver module 210 in a transceiver module. In other examples, the transmitter module 220 may not be collocated with the receiver module 210 in a transceiver module.

Figure 3:
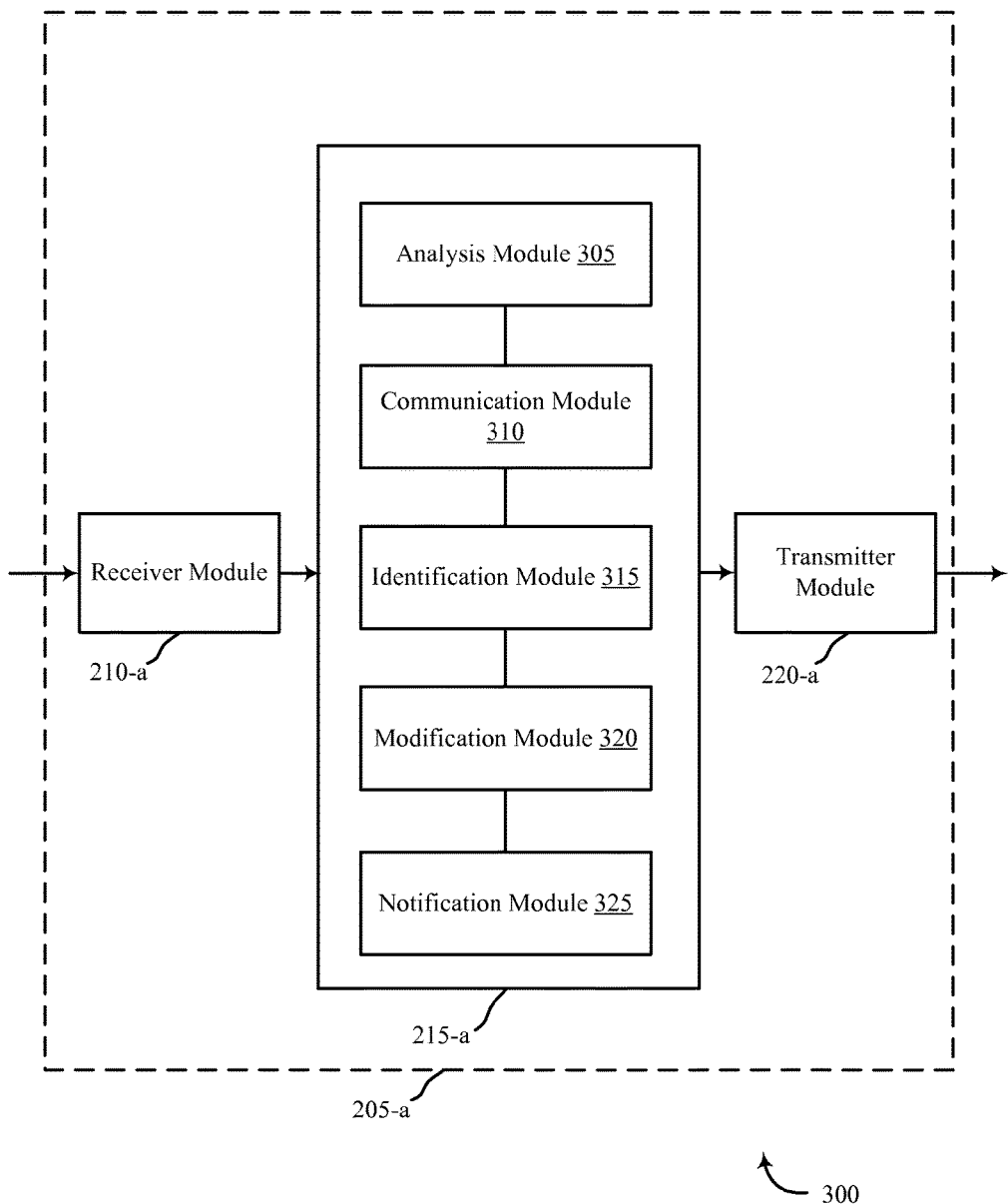
FIG. 3 shows a block diagram of a device relating to a security and/or an automation system, in accordance with various aspects of this disclosure.

FIG. 3 shows a block diagram 300 of an apparatus 205-*a* for use in wireless communication, in accordance with various examples. The apparatus 205-*a* may be an example of one or more aspects of an apparatus 105 described with reference to FIG. 1 and others. It may also be an example of an apparatus 205 described with reference to FIG. 2 and others. The apparatus 205-*a* may include a receiver module 210-*a*, a powered faceplate module 215-*a*, and/or a transmitter module 220-*a*, which each may be examples of the corresponding modules of apparatus 205. The apparatus 205-*a* may also include a processor. Each of these components may be in communication with each other—directly and/or indirectly. The powered faceplate module 215-*a* may include analysis module 305, communication module 310, identification module 315, modification module 320, and/or notification module 325, among others. The receiver module 210-*a* and the transmitter module 220-*a* may perform the functions of the receiver module 210 and the transmitter module 220, of FIG. 2, respectively.

The components of the apparatus 205-*a*, among others, may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

In some embodiments, powered faceplate module 215-*a* may include analysis module 305. Analysis module 305 may perform one or more functions relating to data received, transmitted, and/or otherwise processed by powered faceplate module 215-*a*. Analysis module 305 may perform one or more operations including, but not limited to, analyzing, comparing, correlating, evaluating, weighing, calculating, and/or determining one or more characteristics of relevant information. In some embodiments, analysis module 305 may perform one or more operations relating to a device (e.g., device 115), an apparatus (e.g., apparatus 105), a sensor (e.g., sensor 150), other elements of and/or relating to system 100, and/or other elements of and/or relating to another system. In some embodiments, analysis module 305 may analyze automation data (or any data type), including analyzing data received from one or more powered faceplates, alone and/or in combination with one or more other devices, such as an apparatus 105, a sensor 150, and/or a smart phone device 115, among others. In some embodiments, analysis module 305 may analyze historical data, current data (based a real time and/or pseudo-real time processing), and/or combinations, among other things. Analysis module 305 may, for example, analyze current data from a first device 115 and historical data from a second device 115.

In some embodiments, analysis module 305 may analyze data to determine if a device 115 and/or an apparatus 105 is operating, is operating correctly, is capturing data based on one or more parameters, and/or whether a different device (e.g., device 115, apparatus 105) should perform an operation, among other things. In some embodiments, analysis module 305 may analyze data received from one or more devices, such as powered faceplate device 115, including analyzing whether the data indicates a condition occurred, analyzing whether the data indicates a probability that a condition occurred, analyzing whether the data illustrates movement, movement of a certain type, sounds, sounds of a certain type, proximity, and/or a distance relating to a proximity measurement, etc. In some embodiments, analysis may include analyzing one or more data sets. When multiple data sets are analyzed, powered faceplate module 215-a via analysis module 305 may compare, contrast, correlate, associate, evaluate, assess, and/or perform some other operation relating to the one or more data sets. For example, analysis module 305 may analyze whether data received from one device 115 is the same as, similar to, different from, and/or indicate of one or more conditions relating to another device 115 and/or an apparatus 105.

In some embodiments, powered faceplate module 215-a may include communication module 310. This communication module 310 may facilitate communication between apparatus 205-a, device 115, and/or components of system 100, including but not limited to network 130, remote server 145, and/or remote storage 140. In some embodiments, communication module 310 may facilitate communication between apparatus 205-a and one or more other elements of system 100, such as analysis module 305, identification module 315, modification module 320, notification module 325, receiver module 210-a, transmitter module 220, device 115, and/or sensor 150, among others. In some embodiments, communication module 310 may facilitate communication via one or more connections (e.g., communication link 125). In some embodiments, communication module 310 may facilitate communication via one or more wired and/or wireless connections.

In some embodiments, communication module 310 may generate a transmission in response to receiving one or more signals from one or more other modules, including but not limited to analysis module 305, communication module 310, identification module 315, modification module 320, notification module 325, and/or other components or elements of a system (e.g., system 100, system 200). This transmission may be sent to one or more components and/or elements of system 100.

In some embodiments, powered faceplate module 215-a may communicate directly with one or more other components of system 100. In some embodiments, powered faceplate module 215-a may communicate indirectly with one or more other components of system 100—either through another device (e.g., device 115, apparatus 105) and/or through receiver module 210-a and/or transmitter module 220-a. In some embodiments, apparatus 205-a may communicate through communication module 310 (or not, but instead directly) with powered faceplate device 115, apparatus 105, sensor 150, remote server 145 and/or other components and/or elements via a communication path that includes a combination and/or one or more designated connections (e.g., communication link 125, among others) and/or a network.

In some embodiments, powered faceplate module 215-a may include identification module 315. Identification module 315 may perform one or more functions relating to data received, transmitted, and/or otherwise processed by powered faceplate module 215-a. In some embodiments, identification module may receive information analyzed by analysis module 305. Identification module 315 may perform one or more operations including, but not limited to, classifying, relating, associating, linking, isolating, pinpointing, distinguishing, comparing, correlating, evaluating, weighing, calculating, determining one or more characteristics of relevant information. In some embodiments, identification module 315 may perform one or more operations relating to a device (e.g., device 115), an apparatus (e.g., apparatus 105), a sensor (e.g., sensor 150), other elements of and/or relating to system 100, and/or other elements of and/or relating to another system.

In some embodiments, identification module 315 may identify an existence of a communication connection between one or more components and/or elements, including the existence of a wired and/or a wireless connection. In some embodiments, identification module 315 may identify an existence of a wireless communication connection, and/or whether such wireless communication connection is active, between a powered faceplate device 115 and another powered faceplate device, a device 115, and/or an apparatus 105. In some embodiments, identification module 315 may identify one or more characteristics of and/or relating to automation data, including identifying information within automation data such as movement, voice, proximity, changes in one or more characteristics, temperature, light, time, and/or other characteristics and/or parameters relating to data received from one or more powered faceplates, alone and/or in combination with one or more other devices, such as an apparatus 105, a sensor 150, and/or a smart phone device 115, among others.

In some embodiments, powered faceplate module 215-a may include modification module 320. Modification module 320 may perform one or more functions relating to data received, transmitted, and/or otherwise processed by powered faceplate module 215-a and/or other modules. In some embodiments, modification module may receive information analyzed by analysis module 305 and/or identification module 315. Modification module 320 may perform one or more operations including, but not limited to, modifying, adjusting, adapting, varying (including randomly and/or pseudo-randomly), initiating, cancelling, pausing, powering on, powering off, recording, capturing, enabling, restarting, and/or other functions. In some embodiments, these one or more operations may include modifying one or more operations relating to one or more powered faceplates, sensors, apparatuses, remote servers, user devices, and/or other electronic and/or mechanical components.

In some embodiments, modification module 320 may initiate one or more operations and/or instructions related to a device 115. For example, modification module 320 may modify the operation of a device 115, including adjusting an image device, field of view, direction of view, light sensitivity, sound sensitivity, predetermined threshold level, recapturing of certain data, scheduled monitoring, capturing different and/or additional data, and/or other operations. Modification module 320 may additionally or alternatively modify the operation of multiple devices 115, based on a single input and/or multiple inputs. For example, modification module 320 may modify the operation of a second device 115 and a third device 115 based on data relating to a first device 115, where at least some of these devices may or may not include a powered faceplate device.

In some embodiments, powered faceplate module 215-a may include notification module 325. Notification module 325 may perform one or more functions relating to data received, transmitted, and/or otherwise processed by powered faceplate module 215-a and/or other modules. In some embodiments, notification module 325 may receive information related to analysis module 305, communication module 310, identification module 315, modification module 320, and/or other module. Notification module 325 may perform one or more operations including, but not limited to, generating, sensing, alerting, advising, warning, reporting, and/or other functions.

In some embodiments, these one or more operations may include notifying one or more entities about information relating to one or more modules of apparatus 205-a and/or other components. For example, these one or more operations may include generating and sending a notification to a user via a wireless communication regarding a certain event and/or condition, such as a child moving from one position to another, making an audible sound of a certain volume or relating to one or more keywords, performing one or more actions relating to certain areas of the home (e.g., bedroom, bathroom, kitchen, hallway), and/or performing one or more operations relating to one or more powered faceplates, sensors, apparatuses, remoter servers, user devices, and/or other devices. In some embodiments, notification module 325 may perform one or more operations relating to a notification of a non-user device, such as a monitoring system and/or an alarm system. These one or more notifications may be triggered based on data relating to only one device (e.g., device 115, apparatus 105), and/or one or more devices. In some embodiments, these notifications may be generated based on progressive monitoring of an area, a time, and/or a monitoring protocol, among other things.

In some embodiments, notification module 325 may initiate one or more operations and/or instruction related to a device 115. For example, notification module 325 may modify the operation of a device 115, based on a generated notification (and/or any other communication), a user input, a lack of user input and/or response to a notification (and/or any other communication), a user preference, a predetermined system setting, and/or other things.

Figure 4:
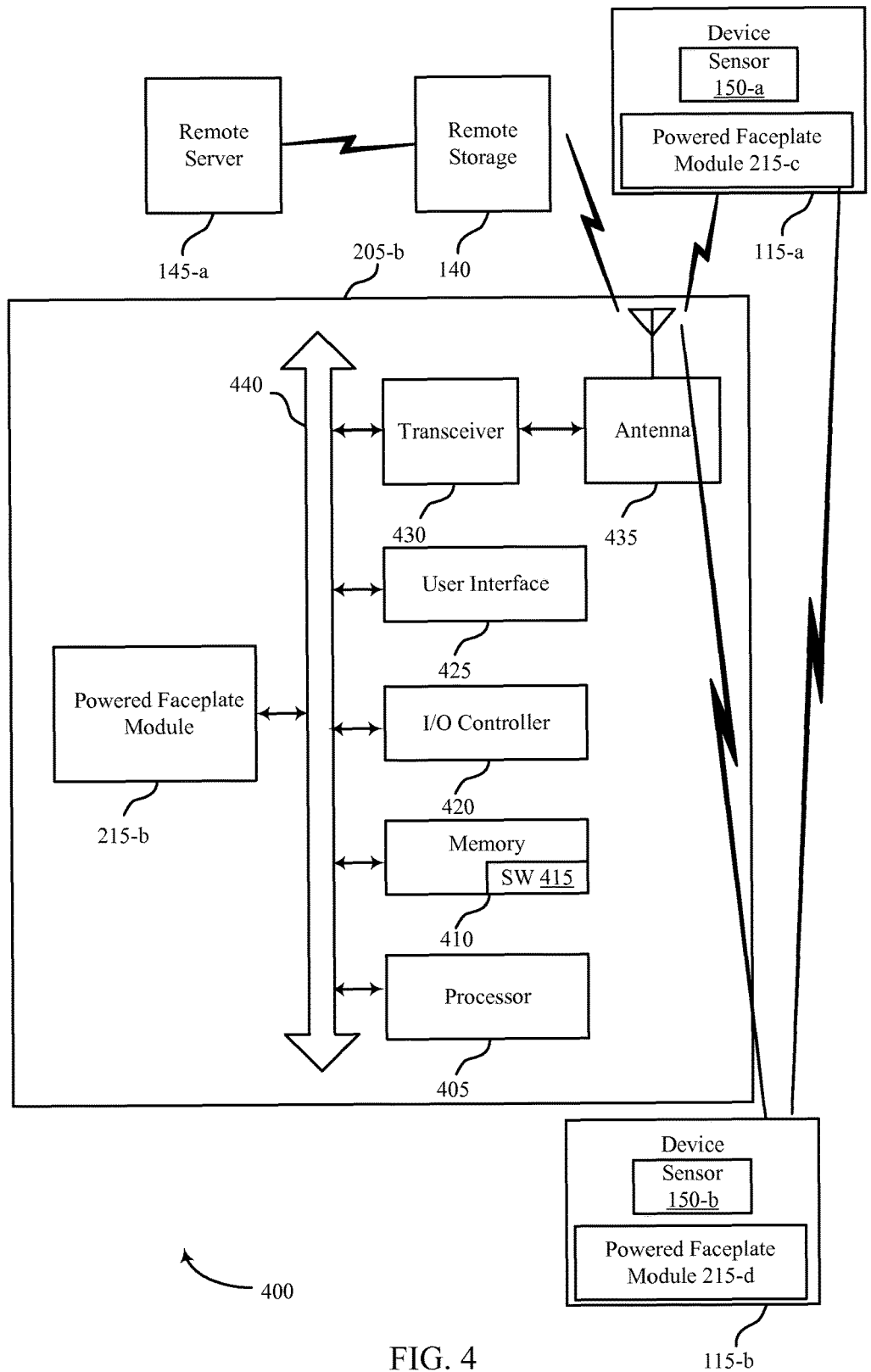
FIG. 4 shows a block diagram relating to a security and/or an automation system, in accordance with various aspects of this disclosure.

FIG. 4 shows a system 400 for use in powered faceplate integration systems, in accordance with various examples. System 400 may include an apparatus 205-b, which may be an example of the apparatuses 105 of FIG. 1. Apparatus 205-b may also be an example of one or more aspects of apparatuses 205 and/or 205-a of FIGS. 2 and 3. In some embodiments, apparatus 205-b may be an example of a control panel.

Apparatus 205-b may include powered faceplate module 215-b, which may be an example of powered faceplate module 215 and/or 215-a described with reference to FIGS. 2 and 3. Moreover device 115-a and/or device 115-b may include powered faceplate module 215-c and 215-d respectively, which may be examples of powered faceplate module 215 and/or 215-a described with reference to FIGS. 2 and 3.

Apparatus 205-b may also include components for bi-directional voice and data communications including components for transmitting communications and components for receiving communications. For example, apparatus 205-b may communicate bi-directionally with one or more of device 115-a, device 115-b, one or more sensors 150-a and/or 150-b, remote storage 140, and/or remote server 145-a, which may be an example of the remote server of FIG. 1. This bi-directional communication may be direct (e.g., apparatus 205-b communicating directly with remote storage 140) or indirect (e.g., apparatus 205-b communicating indirectly with remote server 145-a through remote storage 140).

The powered faceplate module 215-b may identify active communication connections, receive automation data, analyze automation data and other information, identify one or more characteristics relating to the automation data and/or other information, modify one or more and/or operations relating to one or more devices, and/or initiate one or more operations relating to one or more devices based at least in part on data received, determined trends, input of one or more types, environmental factors, system status, and/or user preferences, among other things, as described above with reference to FIGS. 1-3 and throughout this disclosure. For example, apparatus 205-b may perform one or more operations relating to powered faceplate module 215-b and then initiate and/or perform one or more operations relating to itself, and/or one or more other devices, such as device 115-a and/or 115-b, and/or remote server 145-a, among others.

As shown in FIG. 4, apparatus 205-b may include one or more elements including elements 405, 410, 415, 425, 430, 435, 440, and/or others, discussed below. Other devices, including, but not limited to, devices 115-a and/or 115-b, may include one or more of elements 405, 410, 415, 425, 430, 435, 440. Thus, specific devices, including powered faceplate devices 115 may include one or more elements described with respect to apparatus 205-b, with respect to FIG. 4 and/or otherwise. In some embodiments, powered faceplate devices 115 may perform some and/or all of the operations and/or functions discussed for apparatus 205-b, and the powered faceplate devices 115 may function independent of an apparatus 205-b. In such independent embodiments, the powered faceplate devices 115 may operate and/or communicate directly with remote storage 140 and/or remote server 145-a, among other elements.

Apparatus 205-b may also include a processor module 405, and memory 410 (including software/firmware code (SW) 415), an input/output controller (I/O) module 420, a user interface module 425, a transceiver module 430, and one or more antennas 435 each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of device 115-a, remote storage 140, and/or remote server 145-a. The transceiver module 430 may include a modem to modulate the packets and provide the modulated packets to the one or more antennas 435 for transmission, and to demodulate packets received from the one or more antenna 435. While an apparatus or a control device (e.g., 205-b) may include a single antenna 435, the apparatus or the control device may also have multiple antennas 435 capable of concurrently transmitting or receiving multiple wired and/or wireless transmissions. In some embodiments, one element of apparatus 205-b (e.g., one or more antennas 435, transceiver module 430, etc.) may provide a direct connection to a remote server 145-a via a direct network link to the Internet via a POP (point of presence). In some embodiments, one element of apparatus 205-b (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver module 430 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 435 may receive signals or information specific and/or exclusive to itself. In other embodiments, each antenna 435 may receive signals or information not specific or exclusive to itself.

In some embodiments, one or more sensors 150-a (e.g., motion, proximity, smoke, light, glass break, door, window, carbon monoxide, and/or another sensor) may connect to some element of system 400 via a network using one or more wired and/or wireless connections.

In some embodiments, the user interface module 425 may include an audio device, such as an external speaker system, an external display device such as a display screen, and/or an input device (e.g., remote control device interfaced with the user interface module 425 directly and/or through I/O controller module 420).

One or more buses 440 may allow data communication between one or more elements of apparatus 205-b (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., identifying one or more conditions, receiving certain data, modifying operations, initiating operations, analyzing information, etc.). Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405 but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the memory 410 can contain, among other things, the Basic Input-Output system (BIOS) which may control basic hardware and/or software operation such as the interaction with peripheral components or devices. For example, the powered faceplate module 215-b to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

Many other devices and/or subsystems may be connected to one or may be included as one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be iOS®, ANDROID®, MS-DOS®, MS-WINDOWS®, OS/2®, UNIX®, LINUX®, or another known operating system.

The transceiver module 430 may include a modem configured to modulate the packets and provide the modulated packets to the antennas 435 for transmission and/or to demodulate packets received from the antennas 435. While the apparatus or control device (e.g., 205-b) may include a single antenna 435, the apparatus or control device (e.g., 205-b) may have multiple antennas 435 capable of concurrently transmitting and/or receiving multiple wireless transmissions.

Figure 5:
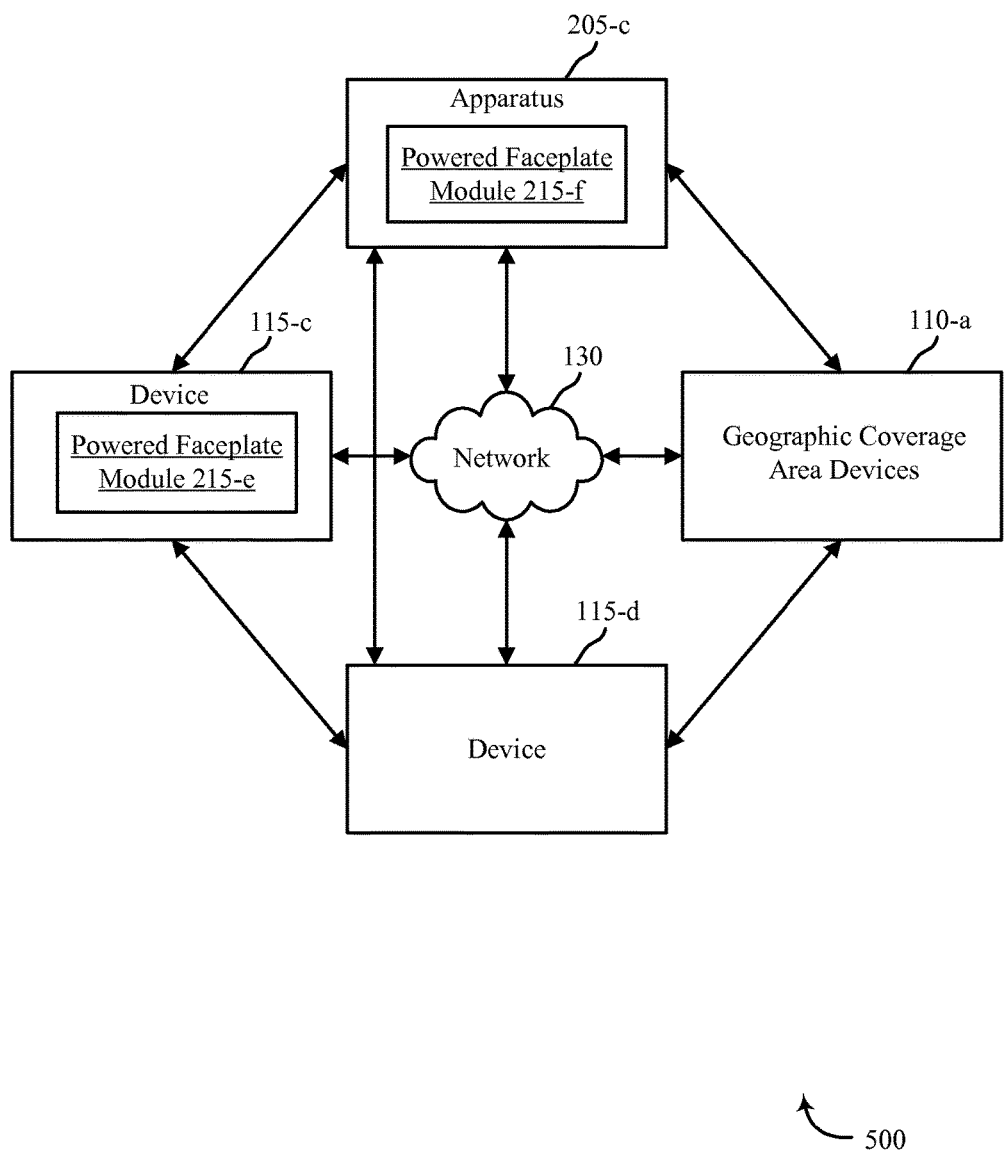
FIG. 5 shows a block diagram of an apparatus relating to a security and/or an automation system, in accordance with various aspects of this disclosure

FIG. 5 illustrates an example of a system 500 in accordance with various aspects of the disclosure. The system 500 may include apparatus 205-c, device 115-c, device 115-d, and one or more devices within geographic coverage area 110-a, network 130, and/or other components. In some embodiments, these one or more components may communicate with each other using similar, different, exactly the same, and/or other variations of different signals.

In some embodiments, apparatus 205-c may communicate directly and/or indirectly with other devices via wired and/or wireless connections. Indirect communication may include communicating with one or more devices via network 130. Additionally and/or alternatively, indirect communication may include communicating with one device through another device. For example, apparatus 205-c may communicate with device 115-d through device 115-c. In some embodiments, this indirect communication may be facilitated by powered faceplate module 215-e and/or 215-f. In some embodiments, each powered faceplate device 115 may be able to and/or configured to communicate with one or more other devices.

In some embodiments, multiple powered faceplate devices 115 may communicate with other similar powered faceplate devices that may be separated by a distance. Then, in some embodiments, after a certain parameter, threshold, limit, and/or other constraint is met (e.g., the number of powered faceplate devices 115 communicating, a calculated distance from an origin device 115 to another device 115), that powered faceplate device may communicate with an apparatus 205-c and/or any other device, such as a remote server 145. In some embodiments, a device 115-d may not require all and/or any of the elements of a powered faceplate module 215 to function and/or may function based on including different modules. As another example, apparatus 205-c may communicate with device 115-d through one or more devices within geographic coverage area 110-a.

In some embodiments, network 130 may comprise a wireless network only. In some embodiments, network 130 may comprise a wired network only. In some embodiments, network 130 may comprise a wireless and a wired network.

Figure 6:
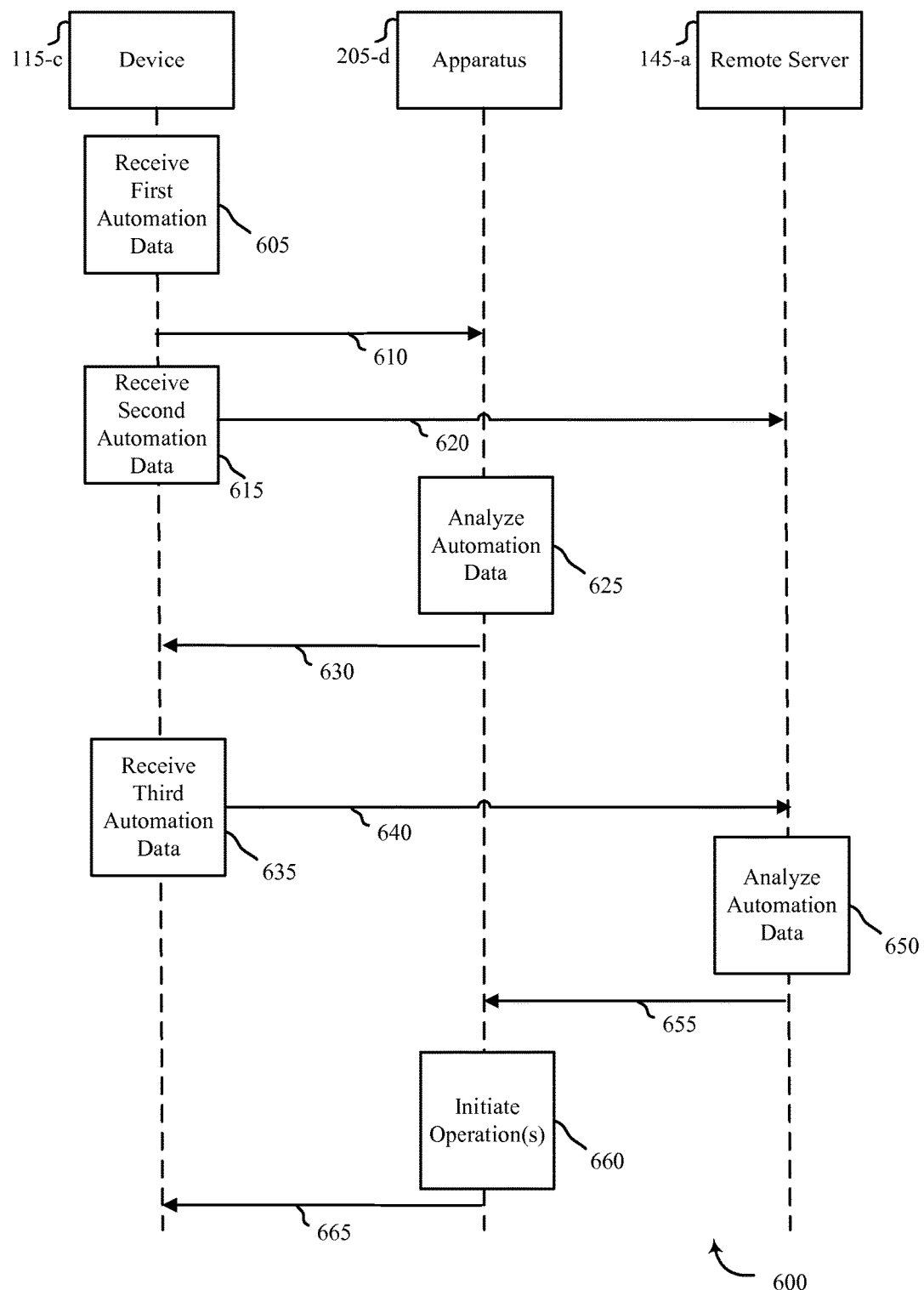
FIG. 6 shows a flow chart illustrating examples of methods relating to a security and/or an automation system, in accordance with various aspects of this disclosure.

FIG. 6 illustrates an example of a system 600 in accordance with various aspects of the disclosure. The system 600 may include device 115-c, apparatus 205-d, remote server 145-a, network 130, and/or other components. In some embodiments, these one or more components may communicate with each using similar, different, exactly the same, and/or other variations of different signals and/or methods.

In some embodiments, powered faceplate device 115-c may capture and/or receive automation data (among other operations), as shown by first automation data block 605. In some embodiments, this automation data may include, but is not limited to, data relating to images (including video and/or still image data), motion, proximity, occupancy (e.g., sleeping habits, entering trends, exiting trends, weekday vs. weekend schedules, power usage, device usage, appliance usage, user preferences, system requirements, etc.), voice, sound pitch, sound volume, key words, temperature, heat signatures, humidity, smoke, structural features (e.g., glass breaking, window position, door position), time, sound data (sonic, ultrasound, etc.) geo-location data of a user and/or a device, distance, biometrics, weight, speed, height, size, preferences, light, darkness, weather, system performance, and/or other inputs that relate to a security and/or an automation system, among others.

As shown by arrow 610, powered faceplate device 115-c may communicate with apparatus 205-d (transmitting, receiving, and/or transmitting and receiving).

In some embodiments, powered faceplate device 115-c may capture and/or receive automation data (among other operations), as shown by second automation data block 615. In some embodiments this receiving may include receiving information captured by another powered faceplate device and/or another device, and/or may include both capturing automation data (via device 115-c) and receiving other automation data from one or more other devices 115. As shown by arrow 620, powered faceplate device 115-c may communicate with remote server 145-a (transmitting, receiving, and/or transmitting and receiving).

Based at least in part on the first and second automation data, at least one of the apparatus 205-d and the remote server 145-a may analyze at least some of the automation data (among other operations), as indicated by block 625. For example, in some embodiments, analyzing the automation data at block 625 may include analyzing the first automation data that may be received by the apparatus 205-d. In other embodiments, analyzing the automation data at block 625 may include analyzing the first automation data and/or the second automation data, either of which may be received by the apparatus 205-d.

As shown by arrow 630, apparatus 205-d (or in other embodiments, another devices and/or other devices) may communicate with powered faceplate device 115-c (transmitting, receiving, and/or transmitting and receiving). This communication may include initiating an operation, communicating regarding a modification, and/or some other operation. In some embodiments, based at least in part on the operation initiated at 630, powered faceplate device 115-c may perform one or more operations related to third automation data as shown by block 635. These one or more operations may include capturing, receiving, generating, combining, ordering, group, transmitting, and/or one or more other operations. As shown by arrow 640, powered faceplate device 115-c may communicate with remote server 145-a (either transmitting and/or transmitting and receiving).

Based at least in part on the first and second automation data, at least one of the apparatus 205-d and the remote server 145-a may analyze at least some of the automation data (among other operations), as indicated by block 650. For example, in some embodiments, analyzing the automation data at block 650 may include analyzing the third automation data that may be received by the remote server 145-a. In some embodiments, this analysis may include analyzing third automation data, alone and/or in combination with first automation data and/or second automation data, among other information.

As shown by arrow 655, remote server 145-a may communicate with apparatus 205-d (transmitting, receiving, and/or transmitting and receiving). In some embodiments, apparatus 205-d may include initiating one or more operations, communicating regarding a modification, and/or some other operation. Based at least in part on the communication relating to initiated operations, apparatus 205-d may communicate with powered faceplate device 115-c as shown by arrow 665. Any and/or all of these communications between the one or more components may be performed via network 130, which may include wired and/or wireless connections.

Though FIG. 6 displays operations and function relating to automation data, the communications, function, and other information may relate to automation data and/or other related information, including non-automation data.

With respect to FIG. 6 and the other FIGs. of this disclosure, the embodiments shown should not be taken as limiting unless specifically noted. For example, though FIG. 6 shows powered faceplate device 115-c communicating with apparatus 205-d (arrow 610) and remote server 145-a (arrow 620), any of these communications and/or functions may include communicating with only apparatus 205-d, apparatus 205-d and remote server 145-a, only remote server 145-a, and/or apparatus 205-d and remote server 145-a and one or more other devices. Moreover, any functions described with respect to one or more components shown in FIG. 6 may be performed by and/or relate to different components (e.g., those operations performed by apparatus 205-d may be performed by remote server 145-a).

Figure 7:
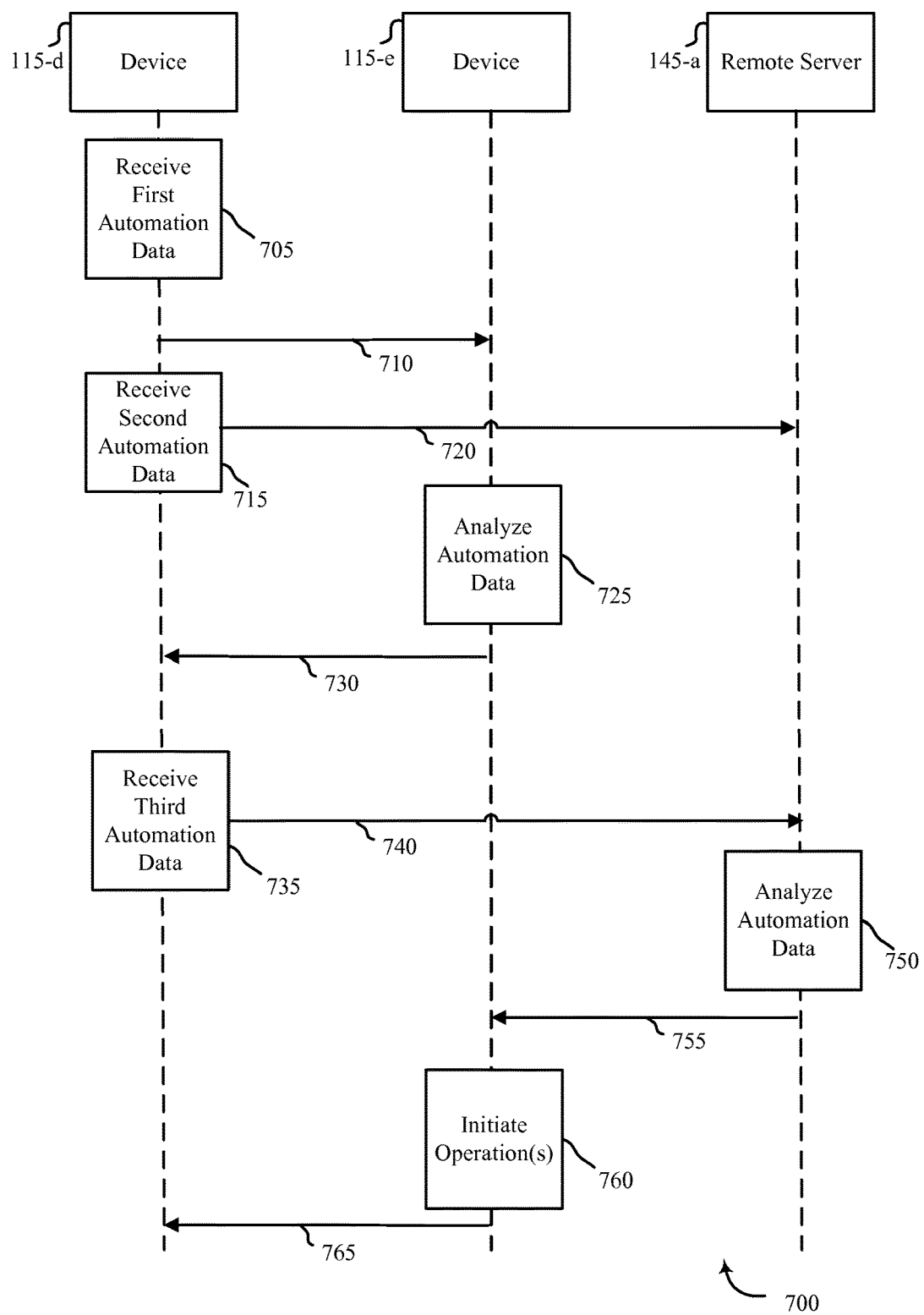
FIG. 7 shows a flow chart illustrating examples of methods relating to a security and/or an automation system, in accordance with various aspects of this disclosure.

FIG. 7 illustrates an example of a system 700 in accordance with various aspects of the disclosure. The system 600 may include device 115-d, device 115-e, network 130, remoter server 145-a, and/or other components. In some embodiments, these one or more components may communicate with each using similar, different, exactly the same, and/or other variations of different signals.

Like FIG. 6, FIG. 7 illustrates exemplary communications between multiple devices. For example, powered faceplate devices 115-*d* and 115-*e* may communicate directly and/or indirectly with remote server 145-*a* and/or each other. In some embodiments, the multiple powered faceplate devices 115-*d* and 115-*e* may communicate with a remote server without utilizing an apparatus (such as apparatus 105).

Figure 8:
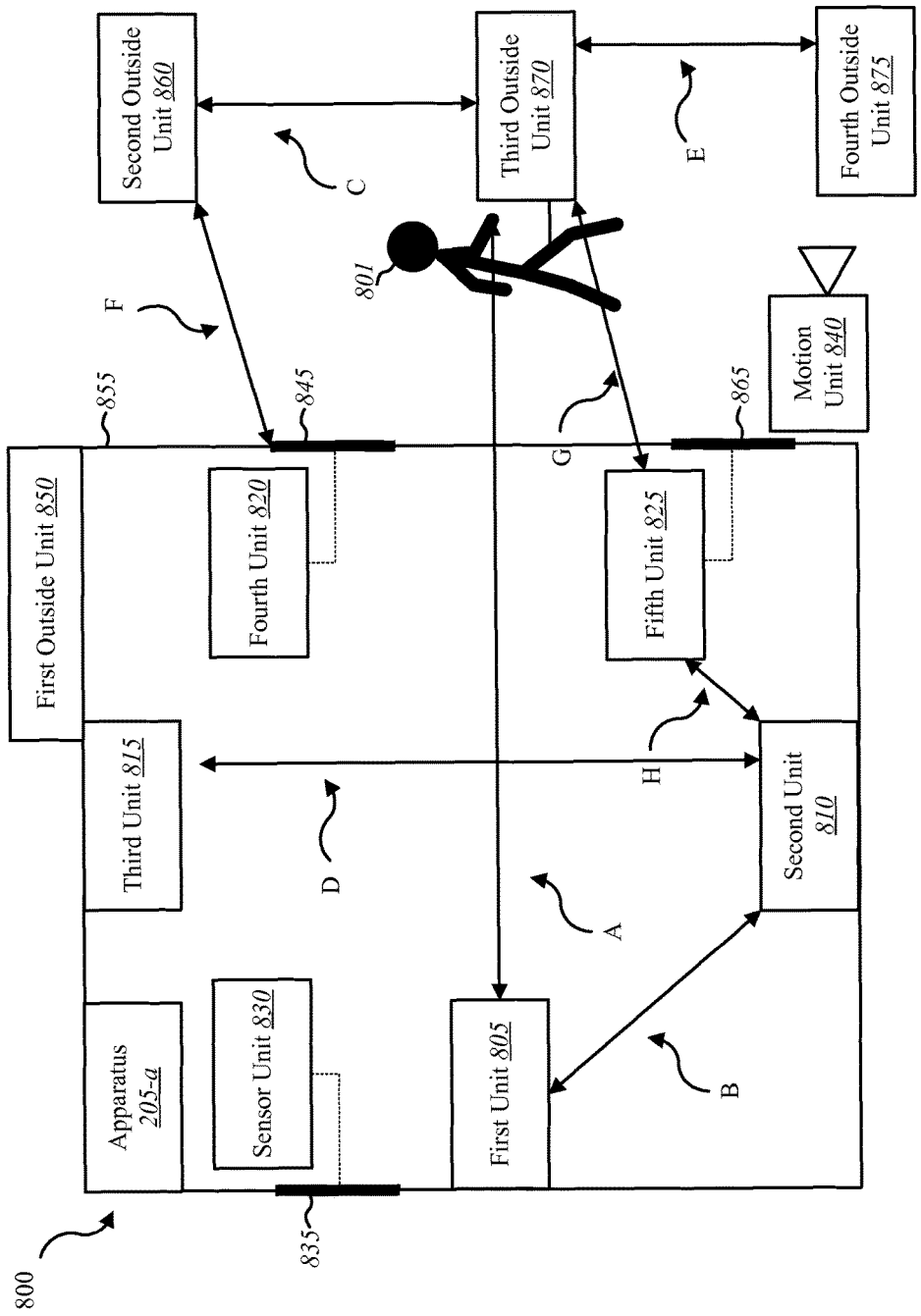
FIG. 8 shows a block diagram relating to a security and/or an automation system, in accordance with various aspects of this disclosure.

FIG. 8 illustrates examples of system 800 in accordance with the present systems, devices, apparatuses, and methods. In some embodiments, one or more devices (e.g., powered faceplate devices 115) may be employed, alone or in combination, with other devices 115, apparatuses (e.g., apparatus 205), sensor units (e.g., 830, 840), and/or other components. In some embodiments, one or more powered faceplate devices 115 may perform one or more actions and/or may communicate with one or more other components, including other powered faceplate devices 115. As an exemplary scenario, an object 801 (such as an occupant, a child, a pet, and/or an intruder) may enter a structure via one or more entry points, such as entry point 835. These one or more entry points may include, but are not limited to doors, windows, etc. In some embodiments, based at least in part on an entry at entry point 835, a first sensor unit 830 may determine one or more characteristics and/or events. In some embodiments, this may be performed based on motion, sound, video, proximity, infrared sensing, and/or some other method, characteristic, protocol, features, and/or user preference, etc.

In some embodiments, based at least in part on information relating to the entry of the object via entry point 835, the operation of first sensor unit 830, and/or other information, first unit 805, which may be an example of a powered faceplate device, may initiate one or more operations, including activating one or more elements, such as an image sensor to capture at least one of video, sound, proximity, and/or motion data. In some embodiments as an object, moves along a path (B) second unit 810 may initiate one or more operations (either alone and/or in combination with first unit 805, and other units) based on information received from first unit 805 via a communication, via a remote server, and/or based on one or more triggered responses (e.g., from a proximity and/or a motion sensor). In some embodiments, each of first unit 805 and second unit 810 may transmit information to an apparatus 205-*a* for processing and/or other operations.

Based on an object's position and/or other information, one or more other elements may initiate one or more operations, including activating and determining data relating to an object, among other things. For example, as an object moves relative to second unit 810, third unit 815, fourth unit 820, and/or fifth unit 825, each (or some subset) may perform one or more of the same, similar, and/or different operations. In some embodiments, these operations may include determining an object's distance, path, trajectory, movement, characteristics (including physical characteristics), powering on one or more related devices 115 and/or appliances, and/or other operations. In some embodiments, the system of powered faceplate devices 115 may include identifying and/or determining characteristics relating to one or more predetermined parameters such as distance, height, etc.

In some embodiments, the system and/or a device may perform one or more operations based on an object's progression along a distance (e.g., A, D, H, B). For example, one or more powered faceplate devices may interact to determine an object movement to an area of a home (e.g., a kitchen) at a relative time of day. Based on identifying the object and/or other characteristics (e.g., time of day, speed, occupancy pattern information, etc.), the unit may activate and determine one or more operations to initiate, including playing a prerecorded function, and/or sending a notification, among others.

As another example, one or more powered faceplate devices may interact to determine a relative position of an object in an area of a home (e.g., a bedroom) at a relative time of day, acting as a type of locator. This locator operation may be performed based on video, sound (including ultrasonic sound emissions and receptions), proximity, motion, and/or other information, including automation data. Based on identifying the object and/or other characteristics (e.g., time of day, speed, occupancy pattern information, etc.), the unit may activate and determine one or more operations to initiate.

In some embodiments, powered faceplate devices 115 may facilitate communication and/or enabling features of the system. For example, powered faceplate devices that are configured to receive information from a user may serve as a communication access point. A user, based on their location relative to one or more powered faceplates 115, may be able to provide certain commands (based on video, audio, gestures, etc.) to influence, modify, and/or adjust, among other things, one or more operations of the powered faceplate device itself, other devices in the same area (e.g., lighting, sound systems, automation components, electronic devices, appliances, etc.), other operations in different areas, etc.

In some embodiments, one or more powered faceplate devices 115 may be positioned at varying positions on one or more levels of a structure. For example, a first powered faceplate (e.g., first unit 805) may be placed at an outlet proximate the floor, a second powered faceplate (e.g., second unit 810) may be placed at waist level, such as proximate an outlet switch, and a third powered faceplate (e.g., third unit 815) may be placed proximate a light fixture near and/or on a ceiling or an upper portion of a wall or a device.

For intruders and/or unwanted guests (among others), the powered faceplate devices 115 (including, for example, those discussed below) provide inconspicuous devices that can capture information in sequence and/or in parallel to track an intruder's movements. Likewise, for non-intruder applications, the powered faceplates, alone or in combination, may also capture and/or track information in sequence and/or in parallel relating to an object's (e.g., a child, a pet) movements, actions, and/or other information.

For example, if a child moves from her bedroom (triggering first unit 805 and second unit 810) and down the hall triggering third unit 815, one or more devices (including but not limited to these units, other units, apparatus 205-*a*, etc.) may perform one or more actions, including generating and/or sending a notification. As another example, if a child moves from her bedroom (triggering first unit 805 and second unit 810) and into a bathroom where third unit 815 detects certain sounds or actions indicating a probability of sickness and/or other condition, one or more devices (including but not limited to these units, other units, apparatus 205-*a*, etc.) may perform one or more actions, including generating and/or sending a notification.

In some cases, these tracked movements may be sent as a notification to a user in real time, at a designated time (e.g., morning, 8:00 a.m., evening), after a certain occurrence and/or pattern, based on one or more user preferences, based on one or more predetermined thresholds, and/or based on one or more combinations of multiple types of data (e.g., movement and/or voice, proximity and/or video, etc.). In some embodiments, a user may receive a notification and/or other information automatically. For example, a powered faceplate device 115 may be positioned in a bathroom and have one or more image sensors (including a fisheye camera at knee and/or waist height), and this powered faceplate device 115 may advantageously capture certain information that can be used to initiate one or more operations and/or relayed to another user.

In some embodiments, powered faceplate devices 115 may be incorporated inside and/or outside a structure, as provided in exemplary first outside unit 850, second outside unit 860, third outside unit 870, and/or fourth outside unit 875. These outside units may or may not be able to operate in conjunction with other components inside a structure (e.g., first sensor unit 830, first unit 805) and/or other components outside a structure (e.g., motion unit 840). In some embodiments, the outside components may facilitate monitoring, identifying, determining, and/or other operations alone or in combination with the inside components (e.g., along example paths C, E, F, G). For example, a person (intruder or not) may approach a structure, such as a home, and a second outside unit 860 may detect and/or otherwise identify movement and/or another characteristic.

Based on this early detection via the inconspicuous powered faceplate, one or more other units may initiate one or more other operations. For example, if a person attempts to enter an entry point 845 or 865 to find each locked, first outside unit 850 may activate to determine movement around structure 855 from entry point 845 to entry point 835. In response to detecting movement, proximity, identifying a person's face, identifying a pet, identifying a non-pet animal, identifying one or more physical characteristics, the time of day, and/or other information the first outside unit 850 may perform one or more operations. For example, the first outside unit 850 (which may include a powered faceplate device) may communicate directly and/or indirectly (via another component and/or apparatus 205-*b*) with a door lock on entry point 835 to lock (or unlock). As another example, the first outside unit 850 (which may include a powered faceplate device) may communicate directly and/or indirectly (via another component and/or apparatus 205-*b*) with a pet door lock on entry point 835 to unlock the pet door based on the pet's approach, among other things.

Figure 9:
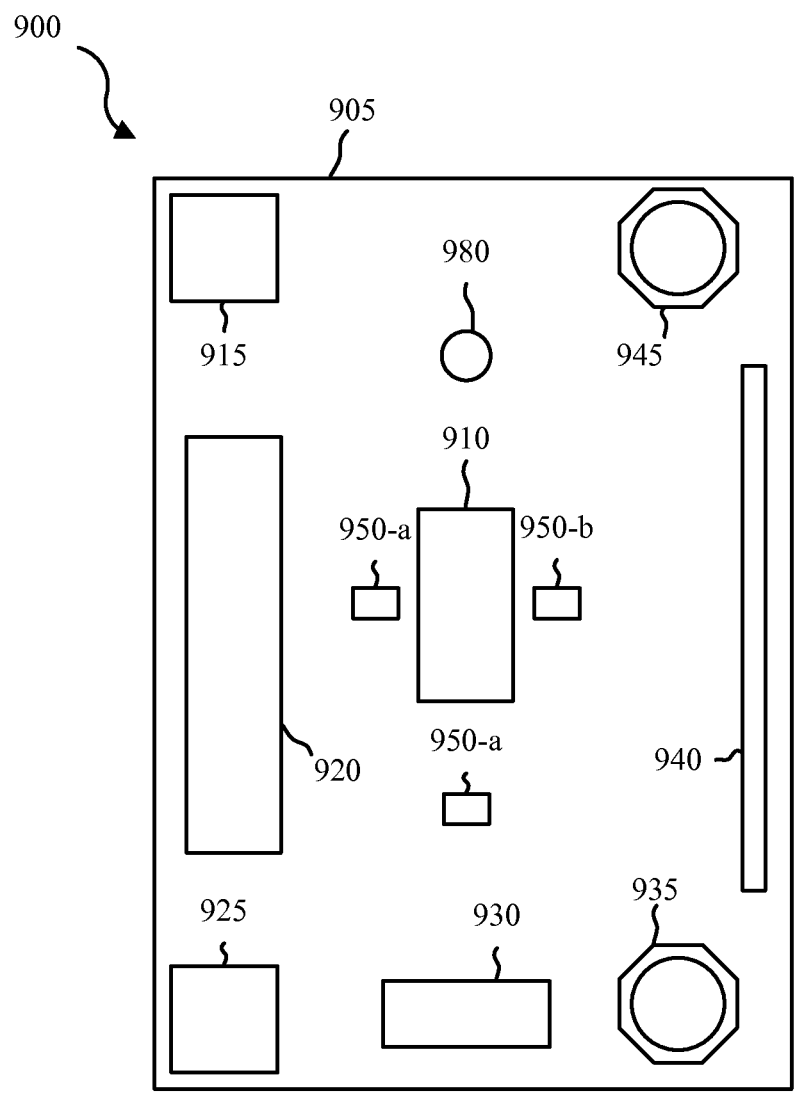
FIG. 9 shows an exemplary apparatus relating to a security and/or an automation system, in accordance with various aspects of this disclosure.

FIG. 9 illustrates examples of apparatus 900, including a powered faceplate device, such as device 115. In some embodiments, powered faceplate device 905 may include an outer surface, an inner surface, one or more holes, and/or one or more projections. In some embodiments the outer surface may be a surface facing outwardly from a wall and/or another mounting surface, among other things. In some embodiments the inner surface may be a surface facing toward a wall, a ceiling, a floor, a furniture part, and/or another mounting surface, among other things. FIG. 9 depicts an outer surface of powered faceplate device 905. In some embodiments, powered faceplate device 905 may be an example of disclosed device 115. Powered faceplate device 905 may be made of, may include, or otherwise utilize one or more materials having one or more properties. These materials may include, but are not limited to, wood, metal, plastics, polymers, composites, and/or combinations of these, among others. In some embodiments, portions of powered faceplate device 905 may include different materials each having the same, similar, and/or different properties. These may include, but are not limited to, conductivity, ability to insulate, opacity, transparency, hardness, toughness, and/or flexibility, among others.

In some embodiments, powered faceplate device 905 may include one or more holes. In some embodiments, the one or more holes may be sized to receive at least a portion of one or more electric components. For example, powered faceplate device 905 may include one or more holes 910 to receive one or more portions of a switch, an outlet, a light fixture, a hanging lamp, an electronically-powered decoration, an electrical connection (e.g., plug, communication jack, USB drive), a fingerprint pad, a video and/or a still camera, and/or other elements, among others. One or more holes 910 may be of various shapes sizes and positions of powered faceplate device 905, including centered, equally spaced, non-equally spaced, etc.

In some embodiments, holes 910 may be positioned so that the powered faceplate device 905 creates a self-contained structure preventing access to the internal components. In some embodiments, powered faceplate device 905 may be free of holes for screws, nails, and/or any fastener that could be used to attach powered faceplate device 905 to a supporting box/structure thereby, for example, easing installation, reducing choking hazards, and providing other advantages.

In some embodiments, the powered faceplate device 115 may include one or more various shapes for design, including, but not limited to, a rectangle, a circle, a square, an oval, a rounded rectangle, a geometric shape, a non-geometric shape, a symmetric shape, an asymmetric shape, and/or other shapes.

In some embodiments, powered faceplate device 905 may include one or more mounting elements (e.g., mounting elements 950-*a*). These mounting elements 950-*a* may each include one or more switches, springs, notches, translators, rotators, and/or other elements to orient one or more projections and/or locking elements on an inner surface of powered faceplate device 905. For example, one or more mounting elements 950-*a* may be configured to permit movement toward a hole 910 in order to actuate a projection on an inner surface of powered faceplate device 905 to permit electrical contact. In other embodiments, one or more mounting elements may also permit movement (e.g., linear, rotation, etc.) to interact with one or more pressure elements that may interact with one or more parts of a mounting surface (e.g., a wall). For example, by moving one or both mounting elements, a pressure device (include a suction device, an adhering device, and/or others) may contact the wall and create a necessary pressure to hold the powered faceplate device 905 in place and prevent removal of the powered faceplate device 905 without performing an additional operation such as releasing one or mounting elements 950-*a* and/or exerting a sufficient force.

In some embodiments, the mounting element 950-*a* may facilitate powering powered faceplate device 905 and effectively locking powered faceplate device 905 to a supporting electrical box and/or other element. In some embodiments, mounting elements 950-*a* may secure powered faceplate device 905 without requiring additional mounting methods. In other embodiments, mounting elements 950-*a* may secure powered faceplate device 905 in conjunction with one or more other mounting elements, including using a fastener with one or more holes 980, as an example. In some embodiments, mounting element 950-*a* may be a part of, be integral with, relate to, interact with, control, and/or otherwise relate to one or more components on the outer surface of powered faceplate device 905 and/or the inner surface of powered faceplate device 905 (e.g., projections 950, 955, 960).

In some embodiments, powered faceplate device 905 may include one or more elements that may be powered by powered faceplate device 905, alone or in combination with one or more other elements. Examples of these elements are shown in FIG. 9 as elements 915, 920, 925, 930, 935, 940, 945, etc.

As discussed above, in some embodiments, one or more of these elements 915-945 may be, include, and/or be associated with one or more sensors 150. In some embodiments, one or more of these elements 915-945 may be, include, and/or be associated with one or more devices to capture and/or emit image data (including but not limited to video, still image, facial recognition, etc.), proximity data, motion data, voice data, audio data, environment data (including but not limited to humidity, temperature, heat signatures, fingerprint, smoke, carbon monoxide, etc.), light, darkness, occupancy (including relative position, movement or lack thereof, occupant position, number of occupants in one or more areas), structural features (e.g., glass breaking, window position, door position), time, geo-location data of a user and/or a device, distance, biometrics, weight, speed, height, size, user preferences, system preferences, system parameters, system limitations, weather, system performance, and/or other inputs that relate to a security and/or an automation system.

In some embodiments, one or more elements of powered faceplate device 905 may include one or more sensors and/or devices within a single housing. For example, element 920 may include a motion sensor and an image sensor, as an example, when the motion sensor is triggered the image sensor may begin to record and/or transmit image data to an apparatus, a remote server, and/or a user device, among others. In some embodiments, powered faceplate device 905 may include one or more elements to emit light, sound, infrared waves, an alarm, a notification, and/or other information relating to a sensor and/or an element, among other things In some embodiments, powered faceplate device 905 may include at least one of a receiver, a transmitter, a transceiver, and/or other device sufficient to communicate with other elements of powered faceplate device 905 and/or other components, such as other components of system 100, including, but not limited to, apparatus 105.

In some embodiments, a transceiver may communicate with one or more other powered faceplates in the same area (e.g., room, end of a home, floor of an office building, etc.) and/or in another area, with one or more apparatuses (e.g., apparatuses 105, 205, control panels, etc.), with one or more home automation and/or security system components (e.g., lighting units, video cameras, door locks (including user door locks and/or pet door locks), window locks, doorbell units, appliances), user devices (e.g., devices 115, smart phones, personal computers of various types, etc.), appliances and/or other electronic devices (e.g., television, audio system, speaker system), one or more remote storage devices and/or remote servers, and/or other devices. In some embodiments, powered faceplate device 905 may communicate via one or more wired and/or wireless connections. In some embodiments, powered faceplate device 905 may include other electrical components including, but not limited to those shown and described with reference to apparatus 205-b in FIG. 4.

In some embodiments, powered faceplate device 905 may incorporate all different sensors and elements or may incorporate at least some similar and/or at least some of the same sensors and/or elements. For example, elements 935 and 945 may each include an image sensor to capture and/or record (among other things) image data. In some embodiments, each of elements 935 and 945 may capture the same type of data (e.g., video data) and/or different types of data (e.g., video and/or still image data) at the same time, serially, alternating, and/or based on some other parameter, among other things.

In some embodiments, powered faceplate device 905 may include elements 935 and 945 to capture data for different purposes and/or in different areas. For example, element 935 may document movement below the powered faceplate device 905 while element 945 may document movement above the powered faceplate. As another example, element 935 may document movement to the right of the powered faceplate device 905 while element 945 may document movement to the left of the powered faceplate. Sometimes the powered faceplate device 905 may employ two similar sensors with at least partially overlapping fields of view to increase accuracy, verify certain inputs, perform identifications and/or determinations (among other things), engage in stereo identification and determinations including using image-based, sound-based, and/or other data for distance, proximity, etc., and/or other operations.

In some embodiments, powered faceplate device 905 may be able to perform a first operation such as capturing sound via a sound sensor or microphone element and then may perform one or more other operations via one or more elements, such as recording and/or analyzing video, determining a temperature, determining a position of an object (e.g., an occupant, a pet, an electronic device, and/or other element), among other things.

In some embodiments, powered faceplate device 905 may be able to perform additional operations based on data and/or information received itself, from another powered faceplate, from an apparatus (e.g., apparatus 205), from a remote server, from a user device (based on a user input, user choice input, etc.), and/or some combination of these and/or other devices. For example, based on a first powered faceplate device 905 receiving one set and/or type of automation data (e.g., image, sound, etc.) the first powered faceplate device 905 may automatically and/or based on an instruction and/or initiated operation then perform additional operations to capture additional data and/or perform one or more additional operations. As another example, first powered faceplate device 905 may receive an instruction and/or initiated operation from apparatus 205 and may capture additional data such as recording video and/or audio.

Figure 10:
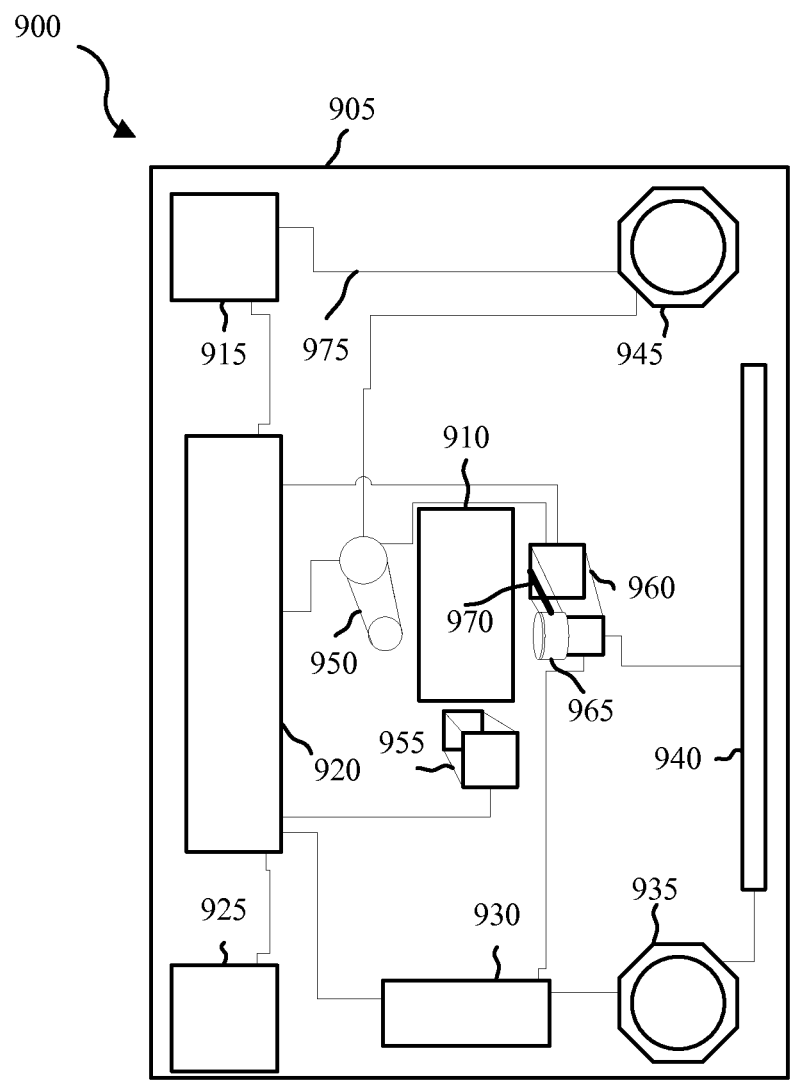
FIG. 10 shows an exemplary apparatus relating to a security and/or an automation system, in accordance with various aspects of this disclosure.

FIG. 10 illustrates examples of apparatus 900, including a powered faceplate device, such as device 115. In some embodiments, powered faceplate device 905 may include an outer surface, an inner surface, one or more holes, and/or one or more locking projections, among other things. FIG. 10 illustrates examples relating to an inner surface of powered faceplate device 905.

In some embodiments, a powered faceplate device 115 may include multiple outer surfaces and/or multiple inner surfaces. Each of these may be curved, flat, and/or otherwise oriented. In some embodiments, a powered faceplate may include multiple outer and inner surfaces that permit capturing automation data in a first direction (e.g., left, south) and/or in a second direction (e.g., right, north). In some embodiments, this powered faceplate device 115 may form a triangle, including a first outer surface, a second outer surface, and a mounting surface to contact a wall, a mounting box, and/or another element.

In some embodiments, one or more elements 915-945 may exhibit certain properties that aid a user in using the powered faceplate device 905. For example, powered faceplate device 905 may include one or more flexible elements to aid the user in mounting, connecting, installing, and/or otherwise using powered faceplate device 905. Powered faceplate device 905 may include one or more flexible portions (e.g., 940) that may facilitate installation of powered faceplate device 905 on a supporting box and/or a wall. A flexible portion may be sized to permit flexibility along an edge of powered faceplate device 905 and/or another portion of the powered faceplate device 905 to permit the powered faceplate to be positioned flush against a related area, such as a wall, at one or more points. The flexible portion (e.g., 940 and/or surrounding 940) may include a material having the same and/or different properties as powered faceplate device 905.

In some embodiments, a flexible portion may include a flexible solar panel that may facilitate powering one or more elements of powered faceplate device 905 (and/or any other connected device) via one or more communication connections 975, which may be wired and/or wireless. In wired applications, at least some of the wire between multiple elements may be shielded, embedded within, exposed, and/or otherwise organized on one or more surfaces of powered faceplate device 905. In some embodiments, one or more of elements 915-945 may communicate with each other, with another powered faceplate device, with an apparatus, with a remote server, and/or another device using a wireless signal. In some embodiments, each element may communicate directly with one or more other elements and/or indirectly with one or more other elements of powered faceplate device 905.

In some embodiments, powered faceplate device 905 may include one or more projections (e.g., 950, 955, 960). These one or more projections may perform one or multiple functions. For example, one or more projections may provide power to powered faceplate device 905 free of electrical wiring. In some embodiments, one or more projections may receive electrical energy from an electrical element relating to another electrical components, such as a light switch, a light fixture, an outlet, etc. In some embodiments, these projections may contact the electrical energy source component and power the powered faceplate device 905. In some embodiments, these projections may capture energy via an electrical field relating to the electrical energy source component and power the powered faceplate device 905 without direct contact. In some embodiments, these projections may include one or more portions that may each be rigid, semi-rigid, flexible, rotatable, and/or spring loaded, among other things. In some embodiments, these projections may capture energy via an electrical field relating to an electrical energy source component relating to another area and power the powered faceplate device 905 without direct contact. The powered faceplate 905 may be configured to receive a ping of electrical energy (from another powered faceplate and/or other device) to power the powered faceplate 905 in a low-energy requirement scenario and/or setup. This low-energy, ping-related operation may facilitate operation and/or communication between multiple powered faceplates and/or other devices.

In some embodiments, the powered faceplate device 905 may rely solely on this derived power from the electrical energy source component. In some embodiments, the powered faceplate device 905 may not rely solely on this derived power from the electrical energy source component but may also include an alternative energy source (e.g., a battery, a solar panel, etc.). In some embodiments, powered faceplate device 905 may include one or more storage elements (e.g., a battery, a capacitor, etc.) that may store power derived from the electrical energy source component and/or one or more alternative power sources. Any wiring and/or wireless communication between one or more storage elements may be specific to the powered faceplate device 905 and may not relate to external wiring and/or other connections between a powered faceplate device 905 and an electrical energy source component.

In some embodiments, the powered faceplate device 905 may include one projection that is sufficient to receive energy from the electrical energy source component sufficient to power the powered faceplate device 905 in order to establish a connection. In some embodiments, this projection may include one or more prongs that may each contact the same and/or separate parts of the powered faceplate device 905. In some embodiments, the powered faceplate device 905 may include multiple projections. These multiple projections may be positioned at various locations on the powered faceplate device 905, including near hole 910, midway between hole 910 and an edge of powered faceplate device 905, midway between hole 910 and an element of powered faceplate device 905, at an edge of powered faceplate device 905, and/or at other locations.

In some embodiments, the projections may include the same, similar, and/or different properties. These properties may include, but are not limited to, cross-sectional design, material, conductivity, function, orientation, taper, rigidity, flexibility, mobility, shape, size, length, width, etc. In some embodiments, these projections may include columns, posts, supports, poles, lines, outcroppings, protrusions, overhangs, boxes, frames, and/or others. In some embodiments, one or more projection may include one element and/or part, while in other embodiments, one or more projections may include multiple elements and/or parts. For example, projection 960 may include a rectangular base portion, a second portion 970, and a distal portion 965. In some embodiments, one or more portions may exhibit one or more different properties, including but not limited to cross-sectional design, material, conductivity, function, orientation, taper, spring, rigidity, flexibility, mobility, shape, size, length, width, etc.

In some embodiments, one or more projections may interact with one or more mounting elements 950-*a*, such that one or more mounting elements 950-*a* may dictate, relate to, and/or influence a projection's interaction with one or more electrical energy source components.

In some embodiments, second portion 970 may include a portion affecting the flexibility of one or more projections, including making the projection more or less flexible in one or more directions. In some embodiments, second portion 970 may include a portion affecting the conductivity of a projection, including serving as a more or less conductive section to facilitate rapid and efficient transmission of electrical energy (or not) between the power source and one or more of the powered faceplate device 905 elements.

In some embodiments, one or more projections, including each projection, may include one or more distal portions (e.g., 965). In some embodiments, a distal portion may include a locking element that may function to lock the projection (and powered faceplate device 905) to another element, including, but not limited to, an electrical energy source component. For example, distal portion 965 may function as a locking component to lock a projection (e.g., projection 960) onto a part of an electrical energy source component (e.g., a screw at a terminal of an outlet, among other things). In some embodiments, the locking component may include an ability to permanently, temporarily, and/or releasably contact, connect, mate, attach, append, stick, join, and/or otherwise interact with one or more portions of an electrical energy source component.

For example, one or more portions of distal portion 965 may be shaped to interact with one or more portions of one or more electrical energy source components, including having a receiving area designed to receive the electrical energy source component. As another example, distal portion 965 may include a female, rounded portion to receive a screw of a power terminal, among other things. In some embodiments, distal portion 965 may be able to adjust relative to one or more other portions of projection 960, an electrical energy source component, and/or another element of powered faceplate device 905. For example, distal portion 965 may extend, rotate, swivel, widen, narrow, adjust, pivot, and/or otherwise move relative to the elongated portion of projection 960 and/or a screw of a power terminal, among other things.

Figure 11:
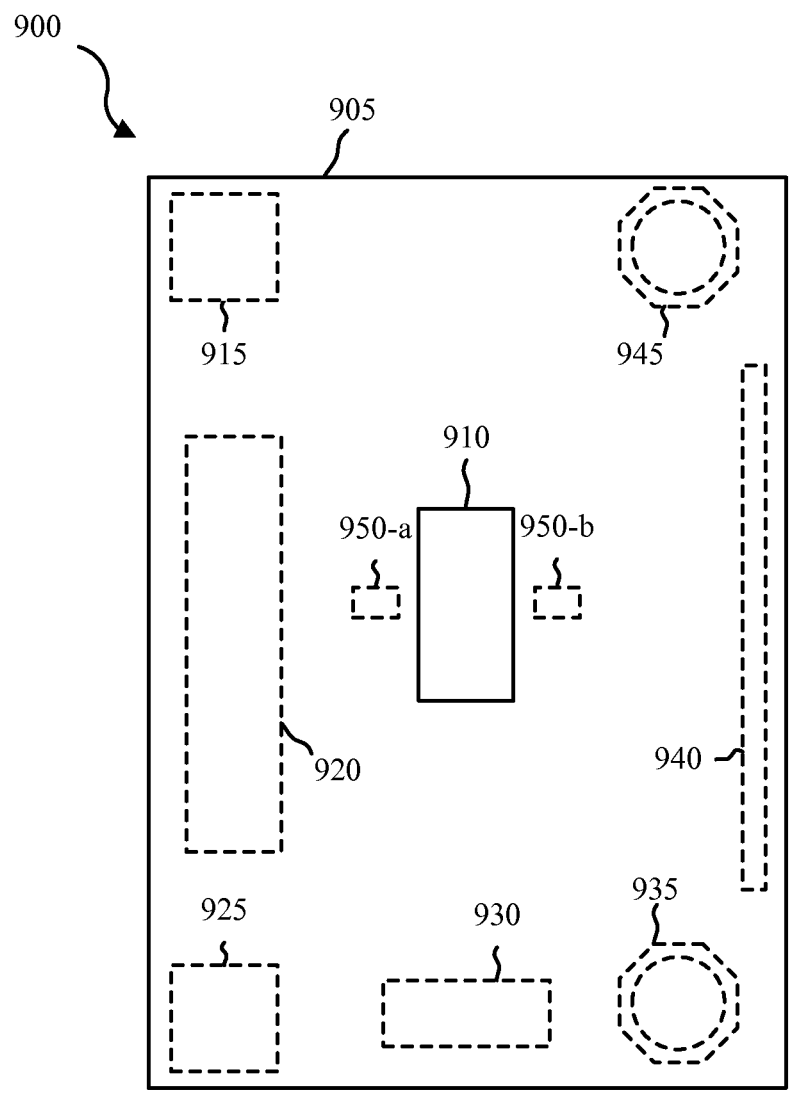
FIG. 11 shows an exemplary apparatus relating to a security and/or an automation system, in accordance with various aspects of this disclosure.

FIG. 11 illustrates examples of apparatus 900, including a powered faceplate device, such as device 115. FIG. 11 illustrates examples relating to an outer surface of powered faceplate device 905. In some embodiments, powered faceplate device 905 may include an outer surface, an inner surface, one or more holes, and/or one or more locking projections.

In some embodiment, powered faceplate device 905 may be free of holes designed for one or more fasteners. Instead, in some embodiments, powered faceplate device 905 may include one or more mounting elements 950-*a* and/or 950-*b* that may lock powered faceplate device 905 into place without requiring additional fasteners. In some embodiments, mounting elements 950-*a* and/or 950-*b* may be disposed within powered faceplate device 905, disposed on an outer surface of powered faceplate device 905, disposed on an inner surface of powered faceplate device 905, and/or some combination. For example, mounting elements 950-*a* and 950-*b* may be at least partially recessed within powered faceplate device 905. As another example, mounting elements 950-*a* and 950-*b* may be positioned entirely on an inner surface of the powered faceplate, such that powered faceplate may include only one or more holes for electrical receptacle elements (e.g., light switch, outlet, light fixture, etc.).

For example, position mounting elements 950-*a* and 950-*b* may be movable from a first position to a second position such that in the second position mounting elements 950-*a* and 950-*b* may be ready to lock one or more projections into place relative to an electrical energy source component. The mounting elements may be configured to automatically move to a third position (which may or may not be the first position) to lock the powered faceplate device 905 in position. This lock may create sufficient force for the powered faceplate device 905 to adhere to the surface to protect the electrical components of itself, an electrical energy source component, and/or other components. The positioned mounting elements may be configured to release based on a predetermined amount of force from pulling on one or more sections of powered faceplate device 905.

In some embodiments, the powered faceplate device 905 may be configured to permit and/or enable the position mounting elements 950-*a* and/or 950-*b* to unlock from a locked position based on one or more inputs, including user input, receiving a signal from one or more other components in system 100, based on a magnetic input near the front face of the powered faceplate device 905, and/or other methods. In some embodiments, the position mounting elements 950-*a* and/or 950-*b* may be included as part of one or more projections (e.g., 950, 955, and/or 960) and similar functions discussed with each respectively may be applied to these embodiments. In some embodiments, the outer face of may be uninterrupted other than one or more holes for electrical receptacle elements.

In some embodiments, one or more elements relating to powered faceplate device 905 may be positioned on and/or in an inner surface of powered faceplate device 905. In some embodiments, powered faceplate device 905 may include fewer holes for electrical components than the powered faceplate device 905 is sized for, such that certain elements (e.g., 915-945) may be oriented and/or organized in a solid space that would otherwise receive an electrical component. For example, a powered faceplate device 905 may be sized for receiving three light switches, but may only include two holes 910 for receiving two light switches while the area of the powered faceplate device 905 that would otherwise be designated to receive a third light switch will permit configuration and/or operation of one or more elements in this area. In some embodiments, the outer surface of powered faceplate device 905 may include a molded and/or otherwise constructed portion that permits one or more elements to operate (e.g., element 925 may capture image data and/or emit a sound) while remaining inconspicuous.

In some embodiments, powered faceplate device 905 may be opaque, translucent, transparent, some combination of these, and/or may include one or more sections of at least one of these. For example, powered faceplate device 905 may include an outer face free of holes for elements but may include one or more transparent, opaque and/or translucent portions, panels, and/or sections (illustrated by dashed lines of elements 915-945), among other things, that permit one or more of elements 915-945 to function. For example, when element 915 includes an image sensor the powered faceplate device 905 may include a transparent, opaque and/or translucent section that permits the element to record image data. Alternatively, if element 925 incorporated a sound sensor, powered faceplate device 905 may include one or more segments of opaque material (among others) that was at least semi-permeable and/or sufficiently thin (if needed) to enable element 925 to function properly.

Figure 12:
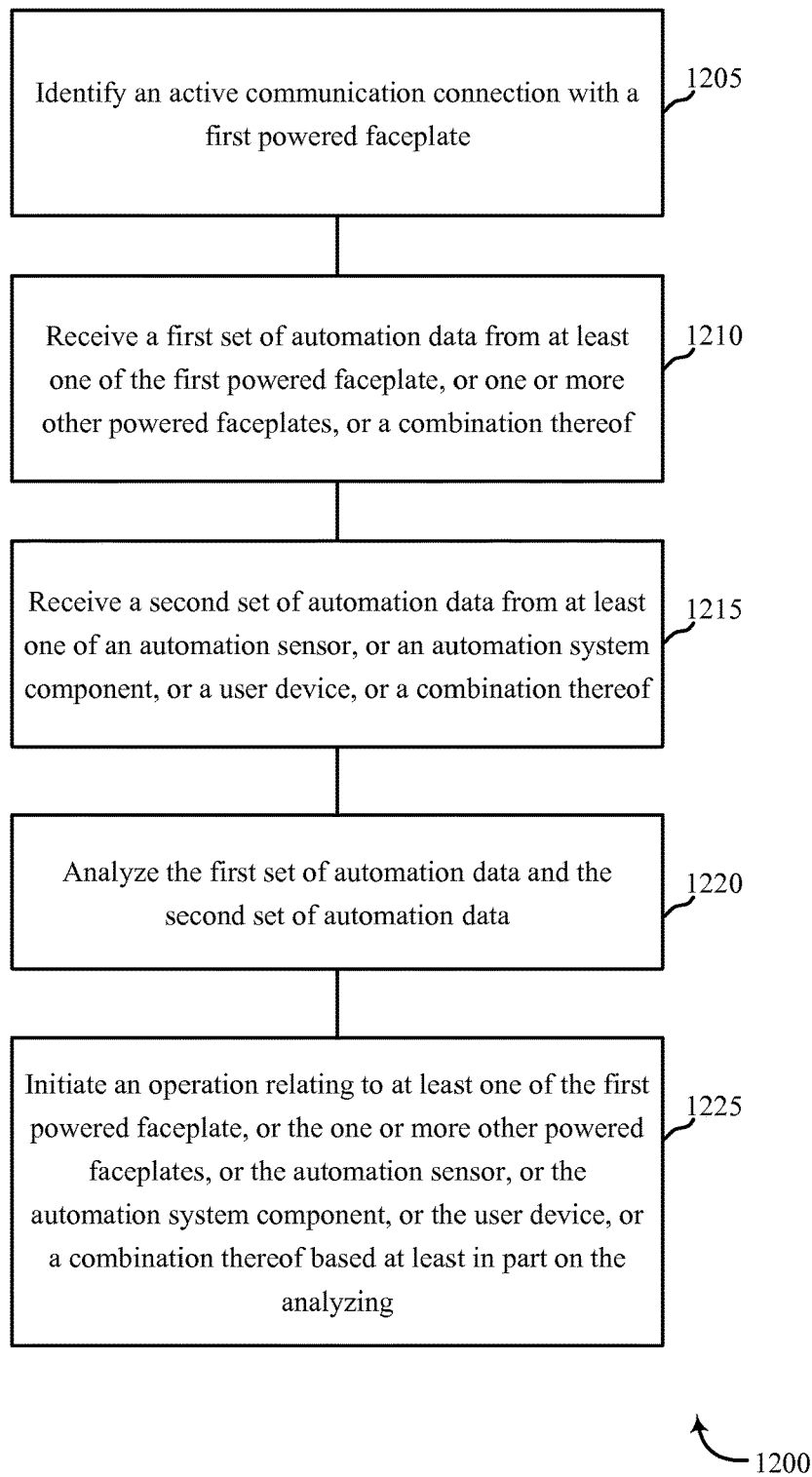
FIG. 12 shows a flow chart illustrating examples of methods relating to a security and/or an automation system, in accordance with various aspects of this disclosure.

FIG. 12 is a flow chart illustrating an example of a method 1200 for powered faceplate integration, in accordance with various aspects of the present disclosure. For clarity, the method 1200 is described below with reference to aspects of one or more embodiments of the powered faceplate modules 215, the apparatuses 105, and/or the powered faceplate devices 115, described with reference to FIGS. 1-11. In some examples, an apparatus, a remote server, and/or one or more powered faceplate devices may execute one or more sets of codes to control the functional elements of the apparatus and/or the one or more powered faceplate devices to perform the functions described below. Additionally or alternatively, another device 115 (e.g., a user device) may perform one or more of the functions described below using special-purpose hardware.

At block 1205, the method 1200 may include identifying an active communication connection with a first powered faceplate. At block 1210, the method 1200 may include receiving a first set of automation data from at least one of the first powered faceplate, or one or more other powered faceplates, or a combination thereof. At block 1215, the method 1200 may include receiving a second set of automation data from at least one of an automation sensor, or an automation system component, or a user device, or a combination thereof. At block 1220, the method 1200 may include analyzing the first set of automation data and the second set of automation data. At block 1225, the method 1200 may include initiating an operation relating to at least one of the first powered faceplate, or the one or more other powered faceplates, or the automation sensor, or the automation system component, or the user device, or a combination thereof based at least in part on the analyzing.

At least some of the operations at blocks 1205-1225 may be performed using the powered faceplate module 215 (and variations) described with reference to FIGS. 2 and 3, among others.

Thus, the method 1200 may provide for powered faceplate integration relating to automation/security systems. It should be noted that the method 1200 is just one implementation and that the operations of the method 1200 may be rearranged or otherwise modified such that other implementations are possible.

Figure 13:
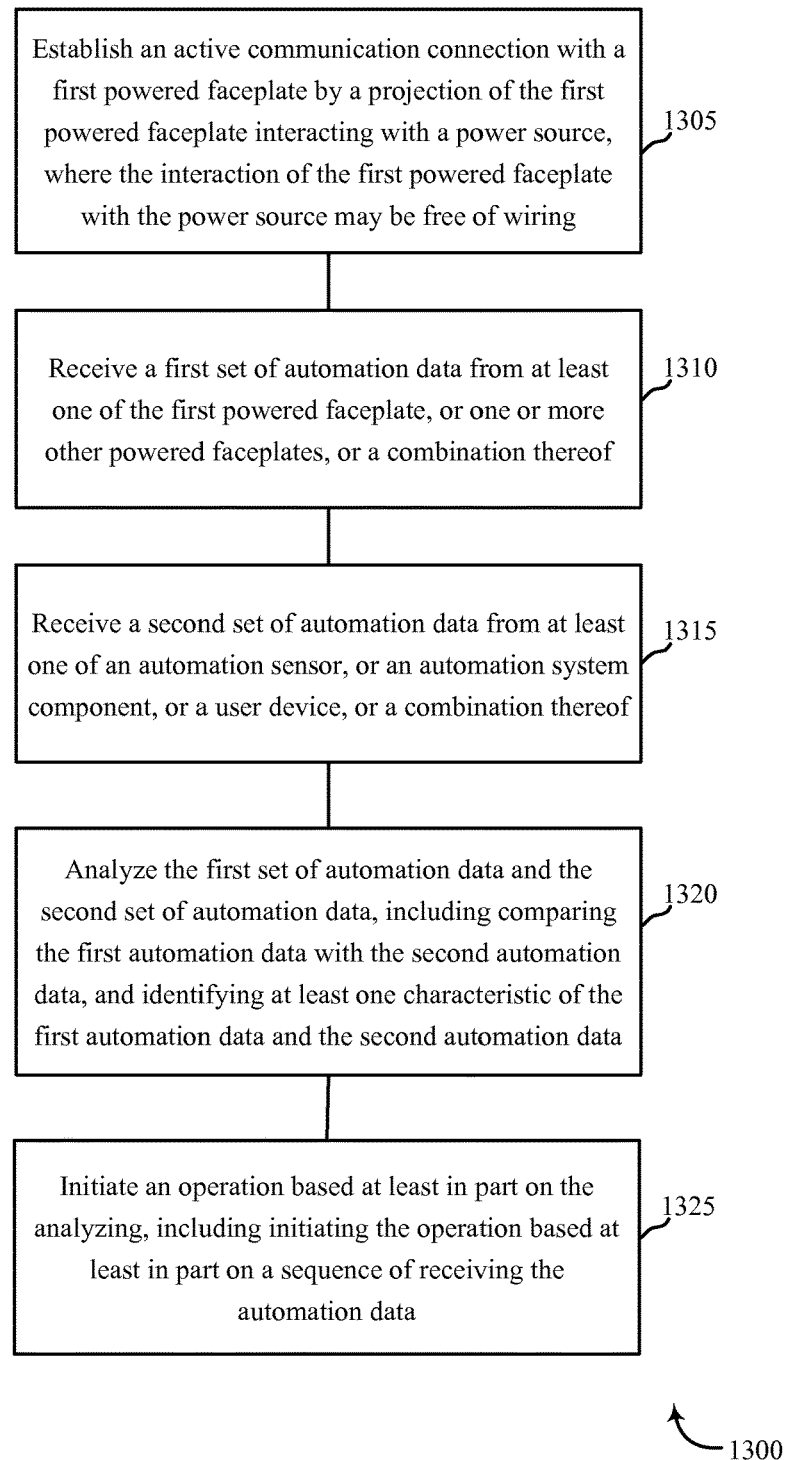
FIG. 13 shows a flow chart illustrating examples of methods relating to a security and/or an automation system, in accordance with various aspects of this disclosure.

FIG. 13 is a flow chart illustrating an example of a method 1300 for powered faceplate integration, in accordance with various aspects of the present disclosure. For clarity, the method 1300 is described below with reference to aspects of one or more embodiments of the powered faceplate modules 215, the apparatuses 105, and/or the powered faceplate devices 115, described with reference to FIGS. 1-11. In some examples, an apparatus, a remote server, and/or one or more powered faceplate devices may execute one or more sets of codes to control the functional elements of the apparatus and/or the one or more powered faceplate devices to perform the functions described below. Additionally or alternatively, another device 115 (e.g., a user device) may perform one or more of the functions described below using special-purpose hardware.

At block 1305, the method 1300 may include establishing an active communication connection with a first powered faceplate by a projection of the first powered faceplate interacting with a power source, where the interaction of the first powered faceplate with the power source may be free of wiring. At block 1310, the method 1300 may include receiving a first set of automation data from at least one of the first powered faceplate, or one or more other powered faceplates, or a combination thereof.

At block 1315, the method 1300 may include receiving a second set of automation data from at least one of an automation sensor, or an automation system component, or a user device, or a combination thereof. At block 1320, the method 1300 may include analyzing the first set of automation data and the second set of automation data, including comparing the first automation data with the second automation data, and identifying at least one characteristic of the first automation data and the second automation data. This analyzing may include, among other things analyzing data over time, trends, correlations, anomalies, outliers, patterns, predetermined programs, user preferences, and/or other information.

At block 1325, the method 1300 may include initiating an operation based at least in part on the analyzing, including initiating the operation based at least in part on a sequence of receiving the automation data. In some embodiments, this sequence may include a sequence specific to only one powered faceplate device 115, multiple powered faceplate devices 115, historical data relating to a user from a home automation system, and/or progressively tracked information from multiple powered faceplate devices 115, among other things.

At least some of the operations at blocks 1305-1325 may be performed using the powered faceplate module 215 (and variations) described with reference to FIGS. 2 and 3, among others.

Thus, the method 1300 may provide for powered faceplate integration relating to automation/security systems. It should be noted that the method 1300 is just one implementation and that the operations of the method 1300 may be rearranged or otherwise modified such that other implementations are possible.

Figure 14:
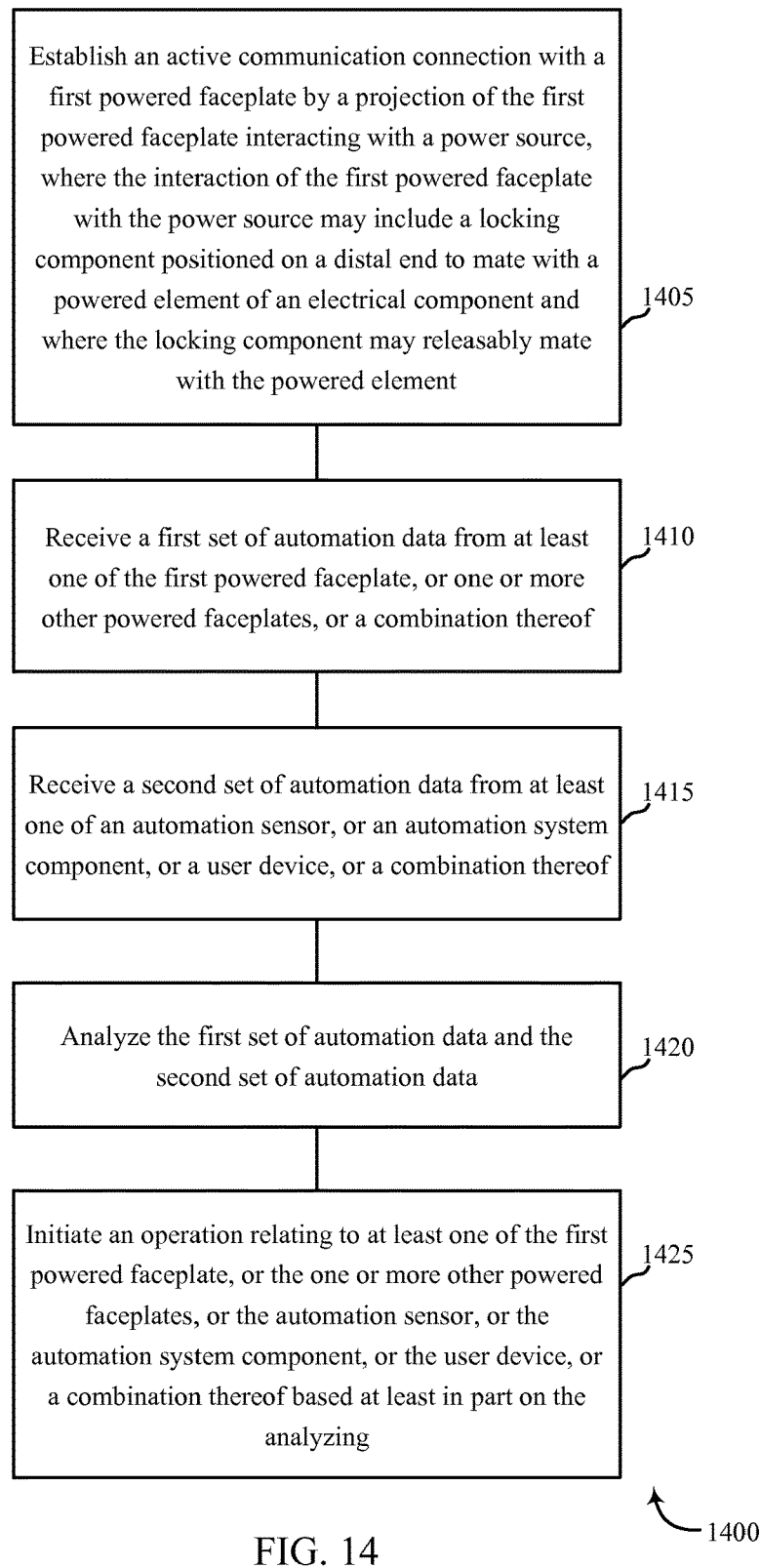
FIG. 14 shows a flow chart illustrating examples of methods relating to a security and/or an automation system, in accordance with various aspects of this disclosure.

FIG. 14 is a flow chart illustrating an example of a method 1400 for powered faceplate integration, in accordance with various aspects of the present disclosure. For clarity, the method 1400 is described below with reference to aspects of one or more embodiments of the powered faceplate modules 215, the apparatuses 105, and/or the powered faceplate devices 115, described with reference to FIGS. 1-11. In some examples, an apparatus, a remote server, and/or one or more powered faceplate devices may execute one or more sets of codes to control the functional elements of the apparatus and/or the one or more powered faceplate devices to perform the functions described below. Additionally or alternatively, another device 115 (e.g., a user device) may perform one or more of the functions described below using special-purpose hardware.

At block 1405, the method 1400 may include establishing an active communication connection with a first powered faceplate by a projection of the first powered faceplate interacting with a power source, where the interaction of the first powered faceplate with the power source may include a locking component positioned on a distal end to mate with a powered element of an electrical component and where the locking component may releasably mate with the powered element. At block 1410, the method 1400 may include receiving a first set of automation data from at least one of the first powered faceplate, or one or more other powered faceplates, or a combination thereof.

At block 1415, the method 1400 may include receiving a second set of automation data from at least one of an automation sensor, or an automation system component, or a user device, or a combination thereof. At block 1420, the method 1400 may include analyzing the first set of automation data and the second set of automation data. At block 1425, the method 1400 may include initiating an operation relating to at least one of the first powered faceplate, or the one or more other powered faceplates, or the automation sensor, or the automation system component, or the user device, or a combination thereof based at least in part on the analyzing.

At least some of the operations at blocks 1405-1425 may be performed using the powered faceplate module 215 (and variations) described with reference to FIGS. 2 and 3, among others.

Thus, the method 1400 may provide for powered faceplate integration relating to automation/security systems. It should be noted that the method 1400 is just one implementation and that the operations of the method 1400 may be rearranged or otherwise modified such that other implementations are possible.

In some examples, aspects from two or more of the methods 1200-1400 (among others described herein) may be combined, omitted, and/or separated. It should be noted that the methods 1200, 1300, 1400, etc. are just example implementations, and that the operations of the enumerated methods 1200-1400 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for operating a security and/or automation system using one or more powered faceplates mounted on a surface, comprising:
   identifying, by a processor, an active communication connection with a first powered faceplate from one or more powered faceplates;
   receiving, by the processor, a first set of automation data captured from the first powered faceplate;
   receiving, by the processor, a second set of automation data from at least one of an automation sensor, or an automation system component, or a user device;
   determining, by the processor, a sequence of capturing the first set of automation data and the second set of automation data;
   determining a movement of an object or entity from a first location to a second location based at least in part on the sequence of capturing the first and second sets of automation data;
   analyzing, by the processor, the first set of automation data and the second set of automation data; and
   initiating, by the processor, an operation relating to the security and/or automation system based at least in part on the analyzing and determining the sequence and movement, wherein initiating the operation further comprises:
   generating a notification based at least in part on the analyzing and determining the sequence and movement;
   sending the notification to a user, wherein the notification is sent in real time, at a designated time, or based at least in part on the determined sequence and movement.

2. The method of claim 1, wherein the first set of automation data and the second set of automation data each comprises:
   at least one of image data, or proximity data, or audio data, or motion data, or environment data, or a combination thereof.

3. The method of claim 1, wherein the first powered faceplate is not wired to a power source.

4. The method of claim 1, wherein the first set of automation data comprises:
   first automation data captured by the first powered faceplate and second automation data captured by a second powered faceplate,
   wherein the first powered faceplate captures the first set of automation data during a different time than the second powered faceplate captures the second automation data.

5. The method of claim 1, wherein the operation comprises:
   an instruction,
   wherein the first set of automation data comprises:
   first automation data captured by at least one of the first powered faceplate and second automation data captured by a second powered faceplate, and
   wherein second automation data is captured based at least in part on the instruction.

6. The method of claim 1, wherein the first set of automation data comprises:
   first automation data captured by the first powered faceplate and second automation data captured by the a second powered faceplate, and
   wherein capturing the second automation data is based at least in part on the operation.

7. The method of claim 1, wherein the first set of automation data comprises:
   first automation data captured by the first powered faceplate and second automation data captured by a second powered faceplate,
   wherein the first powered faceplate captured the first automation data at least partially during a period that the second powered faceplate captures the second automation data.

8. The method of claim 7, wherein analyzing the first set of automation data comprises:
   comparing the first automation data with the second automation data, and
   identifying at least one characteristic of the first automation data and the second automation data.

9. The method of claim 1, wherein initiating the operation includes communicating via the active communication connection.

10. The method of claim 9, wherein the active communication connection permits communication between the first powered faceplate and a second powered faceplate.

11. The method of claim 1, further comprising:
    establishing the active communication connection by a projection of the first powered faceplate interacting with a power source,
    wherein the interaction of the first powered faceplate with the power source is free of wiring.

12. The method of claim 1, further comprising:
    comparing the first set of automation data with the second set of automation data identifying at least one characteristic of the first set of automation data and the second set of automation data.

13. A security and/or automation system, comprising:
    a powered faceplate having a transceiver and at least one automation component;
    a processor in electronic communication with one or more electrical components; memory in electronic communication with the processor; and
    a processing device in electronic communication with at least one of the one or more electrical components, or the memory, or the processor,
    wherein the processor is executable to:
    identify an active communication connection with a first powered faceplate from one or more powered faceplates mounted on a surface;
    receive a first set of automation data captured from the first powered faceplate;
    receive a second set of automation data from at least one of an automation sensor, or an automation system component, or a user device;
    determine a sequence of capturing the first set of automation data and the second set of automation data;
    determine a movement of an object or entity from a first location to a second location based at least in part on the sequence of capturing the first and second sets of automation data;
    analyze the first set of automation data and the second set of automation data; and initiate an operation relating to the security and/or automation system based at least in part on the analyzing and determining the sequence and movement, wherein initiating the operation further comprises:
generating a notification based at least in part on the analyzing and determining the sequence and movement;
sending the notification to a user, wherein the notification is sent in real time, at a designated time, or based at least in part on the determined sequence and movement.

14. The method of claim 1, wherein the first set of automation data comprises:
first automation data captured by the first powered faceplate in response to a trigger, wherein the trigger comprises detecting at least one of movement or sound.

15. The method of claim 1, wherein the determining the movement of an object or entity further comprises:
receiving sets of automation data from the powered faceplates in sequence or parallel; and
tracking the movement of the object or entity.

* * * * *